(12) United States Patent
Smith et al.

(10) Patent No.: US 12,460,174 B2
(45) Date of Patent: Nov. 4, 2025

(54) MAGNETIC SEPARATION

(71) Applicant: OCTANE BIOTECH INC., Kingston (CA)

(72) Inventors: Timothy Smith, Kingston (CA); Nuala Trainor, Kingston (CA); Kevin Middleton, Toronto (CA); Alexis Pietak, Kingston (CA)

(73) Assignee: OCTANE BIOTECH INC., Kingston (CA)

( * ) Notice: Subject to any disclaimer, the term of this patent is extended or adjusted under 35 U.S.C. 154(b) by 1014 days.

(21) Appl. No.: 17/279,353

(22) PCT Filed: Sep. 25, 2019

(86) PCT No.: PCT/CA2019/051371
§ 371 (c)(1),
(2) Date: Mar. 24, 2021

(87) PCT Pub. No.: WO2020/061696
PCT Pub. Date: Apr. 2, 2020

(65) Prior Publication Data
US 2021/0403856 A1 Dec. 30, 2021

Related U.S. Application Data

(60) Provisional application No. 62/897,041, filed on Sep. 6, 2019, provisional application No. 62/738,331, filed on Sep. 28, 2018.

(51) Int. Cl.
*B03C 1/02* (2006.01)
*C12M 1/00* (2006.01)
(Continued)

(52) U.S. Cl.
CPC ............... *C12M 47/04* (2013.01); *B03C 1/02* (2013.01); *C12M 41/48* (2013.01); *C12N 5/0636* (2013.01)

(58) Field of Classification Search
CPC ......... C12M 47/04; C12M 41/48; B03C 1/02; B03C 1/0332; B03C 2201/18;
(Continued)

(56) References Cited

U.S. PATENT DOCUMENTS

| 4,642,120 A | 2/1987 | Nevo et al. |
| 4,939,151 A | 7/1990 | Bacehowski et al. |

(Continued)

FOREIGN PATENT DOCUMENTS

| AU | 2002/324169 A1 | 3/2003 |
| CN | 105586258 A | 5/2016 |

(Continued)

OTHER PUBLICATIONS

"RoboSep the Fully Automated Cell Separator", Technical Manual [on-line], Stemcell Technologies Inc., 2013, Version 2.4.0.
(Continued)

*Primary Examiner* — Liban M Hassan
(74) *Attorney, Agent, or Firm* — MEDLER FERRO WOODHOUSE & MILLS PLLC

(57) ABSTRACT

Systems, devices and methods for automatic magnetic separation of magnetized targets in a biological sample are herein disclosed, where they comprise a magnetic field shield/barrier controllably operable to control the magnetic field in terms of reaching and attracting the magnetized targets within the biological sample.

9 Claims, 31 Drawing Sheets

(51) Int. Cl.
*C12M 1/36* (2006.01)
*C12N 5/0783* (2010.01)

(58) Field of Classification Search
CPC ..... B03C 2201/26; B03C 1/01; B03C 1/0335; B03C 1/288; G01N 35/0098; G01N 33/54326; C12N 5/0087; C12N 5/0636; C12N 15/1013; C12N 2509/00
See application file for complete search history.

(56) References Cited

U.S. PATENT DOCUMENTS

| | | | |
|---|---|---|---|
| 5,041,138 A | 8/1991 | Vacanti et al. | |
| 5,081,036 A | 1/1992 | Familletti | |
| 5,240,854 A | 8/1993 | Berry et al. | |
| 5,246,699 A | 9/1993 | Debre et al. | |
| 5,424,209 A | 6/1995 | Kearney | |
| 5,478,479 A | 12/1995 | Herrig | |
| 5,549,134 A | 8/1996 | Browne et al. | |
| 5,688,687 A | 11/1997 | Palsson et al. | |
| 5,728,581 A | 3/1998 | Schwartz et al. | |
| 5,786,207 A | 7/1998 | Katz et al. | |
| 5,792,603 A | 8/1998 | Dunkelman et al. | |
| 5,827,729 A | 10/1998 | Naughton et al. | |
| 5,842,477 A | 12/1998 | Naughton et al. | |
| 5,846,828 A | 12/1998 | Peterson et al. | |
| 5,882,929 A | 3/1999 | Fofonoff et al. | |
| 5,891,455 A | 4/1999 | Sittinger et al. | |
| 5,902,741 A | 5/1999 | Purchio et al. | |
| 5,906,934 A | 5/1999 | Grande et al. | |
| 5,922,604 A | 7/1999 | Stapleton et al. | |
| 5,928,936 A | 7/1999 | Ingram | |
| 5,985,653 A | 11/1999 | Armstrong et al. | |
| 5,989,913 A | 11/1999 | Anderson et al. | |
| 5,994,129 A | 11/1999 | Armstrong et al. | |
| 6,048,721 A | 4/2000 | Armstrong et al. | |
| 6,048,722 A | 4/2000 | Farb et al. | |
| 6,060,306 A | 5/2000 | Flatt et al. | |
| 6,096,532 A | 8/2000 | Armstrong et al. | |
| 6,121,042 A | 9/2000 | Peterson et al. | |
| 6,123,655 A | 9/2000 | Fell | |
| 6,197,575 B1 | 3/2001 | Griffith et al. | |
| 6,214,574 B1 | 4/2001 | Kopf | |
| 6,228,635 B1 | 5/2001 | Armstrong et al. | |
| 6,238,908 B1 | 5/2001 | Armstrong et al. | |
| 6,297,046 B1 | 10/2001 | Smith et al. | |
| 6,323,146 B1 | 11/2001 | Pugh et al. | |
| 6,402,941 B1 | 6/2002 | Lucido et al. | |
| 7,148,778 B2 * | 12/2006 | Humphries | B03C 1/288 436/526 |
| 7,348,175 B2 | 3/2008 | Vilendrer et al. | |
| 7,906,323 B2 | 3/2011 | Cannon et al. | |
| 9,629,877 B2 | 4/2017 | Cooper et al. | |
| 10,131,876 B2 | 11/2018 | Kaiser et al. | |
| 10,253,316 B2 | 4/2019 | Masquelier et al. | |
| 10,273,300 B2 | 4/2019 | Bedoya et al. | |
| 11,208,626 B2 | 12/2021 | Mason et al. | |
| 2001/0021529 A1 | 9/2001 | Takagi | |
| 2001/0043918 A1 | 11/2001 | Masini et al. | |
| 2002/0009797 A1 | 1/2002 | Wolf et al. | |
| 2002/0009803 A1 | 1/2002 | Vajta | |
| 2002/0025547 A1 | 2/2002 | Rao | |
| 2002/0037580 A1 | 3/2002 | Schoeb | |
| 2002/0146816 A1 | 10/2002 | Vellinger et al. | |
| 2002/0155487 A1 | 10/2002 | Greenberger et al. | |
| 2002/0179525 A1 | 12/2002 | Shaffer et al. | |
| 2003/0032071 A1 | 2/2003 | Wang et al. | |
| 2003/0040104 A1 | 2/2003 | Barbera-Guillem | |
| 2003/0054335 A1 | 3/2003 | Taya et al. | |
| 2003/0159946 A1 | 8/2003 | Eden et al. | |
| 2003/0215935 A1 | 11/2003 | Coon | |
| 2004/0048364 A1 | 3/2004 | Trosch | |
| 2004/0134849 A1 * | 7/2004 | Lumsden | B03C 1/027 210/222 |
| 2005/0064465 A1 | 3/2005 | Dettloff et al. | |
| 2005/0130297 A1 | 6/2005 | Sarem et al. | |
| 2005/0186671 A1 | 8/2005 | Cannon et al. | |
| 2010/0006509 A1 | 1/2010 | Hornes | |
| 2010/0068764 A1 | 3/2010 | Sista et al. | |
| 2010/0105984 A1 | 4/2010 | Brewer et al. | |
| 2010/0163612 A1 | 7/2010 | Caillon | |
| 2012/0045828 A1 | 2/2012 | Davis et al. | |
| 2012/0115167 A1 * | 5/2012 | Chandler | G01N 33/54326 536/25.4 |
| 2013/0132006 A1 * | 5/2013 | Gwynn | B01L 3/021 702/55 |
| 2014/0179022 A1 * | 6/2014 | Smith | B03C 1/288 422/527 |
| 2014/0302160 A1 | 10/2014 | Achrol et al. | |
| 2015/0344844 A1 | 12/2015 | Better et al. | |
| 2016/0122782 A1 | 5/2016 | Crisman et al. | |
| 2017/0037369 A1 | 2/2017 | Ramsborg et al. | |
| 2017/0051252 A1 | 2/2017 | Morgan et al. | |
| 2019/0211294 A1 | 7/2019 | Karnieli | |

FOREIGN PATENT DOCUMENTS

| | | | |
|---|---|---|---|
| CN | 205570357 U * | 9/2016 | |
| DE | 4021123 A1 | 4/1991 | |
| EP | 0248675 A1 | 12/1987 | |
| GB | 1356794 A | 6/1974 | |
| JP | 2-119772 A | 5/1990 | |
| JP | 2-174848 A | 7/1990 | |
| JP | 3-500847 A | 2/1991 | |
| JP | 5-503418 A | 6/1993 | |
| JP | 6-54678 A | 3/1994 | |
| JP | 6-261736 A | 9/1994 | |
| JP | 7-501206 A | 2/1995 | |
| JP | H08-56646 A | 3/1996 | |
| JP | H11-507229 A | 6/1999 | |
| JP | 2001-275659 A | 10/2001 | |
| JP | 2001-517428 A | 10/2001 | |
| JP | 2002-500004 A | 1/2002 | |
| JP | 2007-203244 A | 8/2007 | |
| JP | 2007237008 A * | 9/2007 | |
| KR | 200243145 Y1 | 9/2001 | |
| WO | 91/05849 A1 | 5/1991 | |
| WO | 93/03142 A1 | 2/1993 | |
| WO | 1997/12960 A2 | 4/1997 | |
| WO | 99/33951 A1 | 7/1999 | |
| WO | 99/47922 A2 | 9/1999 | |
| WO | 2000/046349 A1 | 8/2000 | |
| WO | 01/02030 A2 | 1/2001 | |
| WO | 2001/000783 A2 | 1/2001 | |
| WO | 2002/028996 A1 | 4/2002 | |
| WO | 02/088295 A1 | 11/2002 | |
| WO | 03/022985 A2 | 3/2003 | |
| WO | 03/087292 A2 | 10/2003 | |
| WO | 2003/085101 A1 | 10/2003 | |
| WO | 2005/047529 A1 | 5/2005 | |
| WO | 2009/076560 A2 | 6/2009 | |
| WO | WO-2012113028 A1 * | 8/2012 | B03C 1/286 |
| WO | 2013/130875 A1 | 9/2013 | |
| WO | 2015/034428 A1 | 3/2015 | |
| WO | 2015/162211 A1 | 10/2015 | |
| WO | 2016/069993 A1 | 5/2016 | |
| WO | 2016/118780 A1 | 7/2016 | |
| WO | 2016/168275 A1 | 10/2016 | |
| WO | 2017/068425 A1 | 4/2017 | |
| WO | 2018/015561 A1 | 1/2018 | |
| WO | 2018/136566 A1 | 7/2018 | |

OTHER PUBLICATIONS

Grutzkau, A and Radbruch, A. "Small but Mighty: How the MACS-Technology Based on Nanosized Superparamagnetic Particles has Helped to Analyze the Immune System Within the Last 20 Years." Cytometry Part A., vol. 77A, 2010, pp. 643-647. The entire document, especially p. 645. Print ISSN: 1552-4922 Online ISSN: 1552-4930.

Shi et al., Performance of Mammalian Cell Culture Bioreactor with a New Impeller Design, Biotechnology and Bioengineering, Jun.

(56) References Cited

OTHER PUBLICATIONS 20, 1992, pp. 260-270, vol. 40, John Wiley & Sons, Inc.
Declaration from Mark Selker, Submitted in *Lonza Walkersville, Inc. v. Adva Biotechnology LTD.*, United States District Court for the District of Maryland, Case No. 8:20-cv-03099-PX, Jan. 5, 2022.
Declaration from James C. Leung, Submitted in *Lonza Walkersville, Inc. v. Adva Biotechnology LTD.*, United States District Court for the District of Maryland, Case No. 8:20-cv-03099-PX, Jan. 7, 2022.
Konstantin B. Konstantinov "Monitoring and Control of the Physiological State of Cell Cultures" Biotechnology and Bioengineering, vol. 52, pp. 271-289 (1996) (Year: 1996).
Farndale "Pulsed Electromagnetic Fields Promote Collagen Production in Bone Marrow Fibroblasts via Athermal Mechanisms" Calcif Tissue Int (1985) 37:178-182.
Aitken-Christie et al., Automation in Plant tissue culture—general introduction and overview, in Automation and Environmental Control in Plant Tissue Culture 757 (J. Aitken-Christie, T. Kozai & M. Lila Smith eds., 1995).
Apel et al., Integrated Clinical Scale Manufacturing System for Cellular Products Derived by Magnetic Cell Separation, Centrifugation and Cell Culture, Chemie Ingenieur Technik (2013).
Armstrong et al., Clinical Systems for the Production of Cells and Tissues for Human Therapy, in Novel Therapeutics From Modern Biotechnology 221 (D.L. Oxender et al. eds., 1999).
Blaeschke et al., Induction of A Central Memory and Stem Cell Memory Phenotype in Functionally Active CD4+ and CD8+ CAR T Cells Produced in an Automated Good Manufacturing Practice System for the Treatment of CD19+ Acute Lymphoblastic Leukemia, Cancer Immunology, Immunotherapy vol. 67, pp. 1053-1066 (2018), published Mar. 31, 2018.
Bohnenkamp et al., Bioprocess development for the cultivation of human T-lymphocytes in a clinical scale, Cytotechnology (2002).
Bousso, T-cell activation by dendritic cells in the lymph node: lessons from the movies, 8 Nature Reviews Immunology 675 (2008) ("Bousso 2008").
Basic and Clinical Immunology: Antigen Presentation, T Cell Activation and Deactivation, Clevelandcliniccme, found at https://www.youtube.com/watch?v=EfYpkA4AmFo (2017), last visited Dec. 6, 2020 ("Cleveland Clinic video").
Kaiser et al., Towards a Commercial Process for the Manufacture of Genetically Modified T Cells for Therapy, 22 Cancer Gene Therapy 72-78 (2015).
Kempner et al., A Review of Cell Culture Automation, 7 Journal of the Association for Laboratory Automation 56 (2002) ("Kempner 2002").
Koller et al., Clinical-scale human umbilical cord blood cell expansion in a novel automated perfusion culture system, Bone Marrow Transplantation (1998) ("Koller 1998").
Koller et al., Large-Scale Expansion of Human Stem and Progenitor Cells from Bone Marrow Mononuclear Cells in Continuous Perfusion Cultures, Blood (1993) ("Koller 1993A").
Koller et al., Tissue Engineering: Reconstitution of Human Hematopoiesis Ex Vivo, Biotechnology and Bioengineering (1993) ("Koller 1993B").
Kostov et al., Low-Cost Microbioreactor for High-Throughput Bioprocessing, 72 Biotechnology and Bioengineering, Feb. 5, 2001 ("Kostov 2001").
Krug et al., A GMP-compliant protocol to expand and transfect cancer patient T cells with mRNA encoding a tumor-specific chimeric antigen receptor, Cancer Immunol Immunotherapy (2014) ("Krug 2014").
Levine et al., Global Manufacturing of CAR T Cell Therapy, 4 Molecular Therapy: Methods & Clinical Development 92 (2017).
Lock et al., Automated Manufacturing of Potent CD20-Directed Chimeric Antigen Receptor T Cells for Clinical Use, 28 Human Gene Therapy 10 (2017), ("Lock 2017").
Lu et al., A Rapid Cell Expansion Process for Production of Engineered Autologous CART Cell Therapies, 27 Human Gene Therapy 6 (2016).
Mock et al., Automated manufacturing of chimeric antigen receptor T cells for adoptive immunotherapy using CliniMACS Prodigy, Cytotherapy (2016).
Morse, Technology evaluation: Stem-cell therapy, Aastrom Biosciences Inc., Current Opinion in Molecule Therapeutics (1999) ("Morse 1999").
Oh et al., Frequent Harvesting from Perfused Bone Marrow Cultures Results in Increased Overall Cell and Progenitor Expansion, Biotechnology and Bioengineering (1994).
Priesner et al., Automated Enrichment, Transduction, and Expansion of Clinical-Scale CD62L+ T Cells for Manufacturing of Gene Therapy Medicinal Products, 27 Human Gene Therapy 10, 860-869 (2016).
Rosazza et al., Gene Electrotransfer: A Mechanistic Perspective, Current Gene Therapy (2016) ("Rosazza 2016").
Stiff et al., Autologous transplantation of ex vivo expanded bone marrow cells grown from small aliquots after high-dose chemotherapy for breast cancer, Blood (2000) ("Stiff 2000").
Wang et al., Clinical Manufacturing of CAR T Cells: Foundation of a Promising Therapy, 3 Molecular Therapy—Oncolytics 1 (2016).
Wang et al., Manufacture of Tumor- and Virus-specific T Lymphocytes for Adoptive Cell Therapies, 22 Cancer Gene Therapy 2 (2015).
Zhang et al., Characterization of clinical grade CD19 chimeric antigen receptor T cells produced using automated CliniMACS Prodigy system, Drug Design, Development and Therapy (2018) ("Zhang 2018").
Zhu et al., Closed-system manufacturing of CD19 and dual-targeted CD20/19 chimeric antigen receptor T cells using the CliniMACS Prodigy device at an academic medical center, Cytotherapy (2018).

* cited by examiner

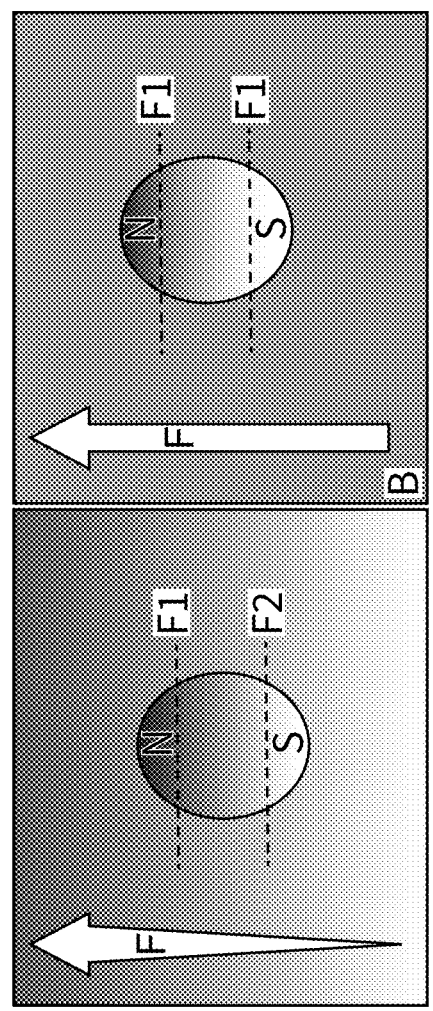
Figure 1A
Figure 1B
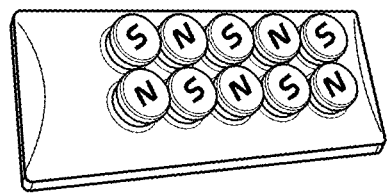
Figure 1C

Electromagnet

Electropermanent

Magnetic Circuit
(Permanent Magnet Array)

Halbach Array

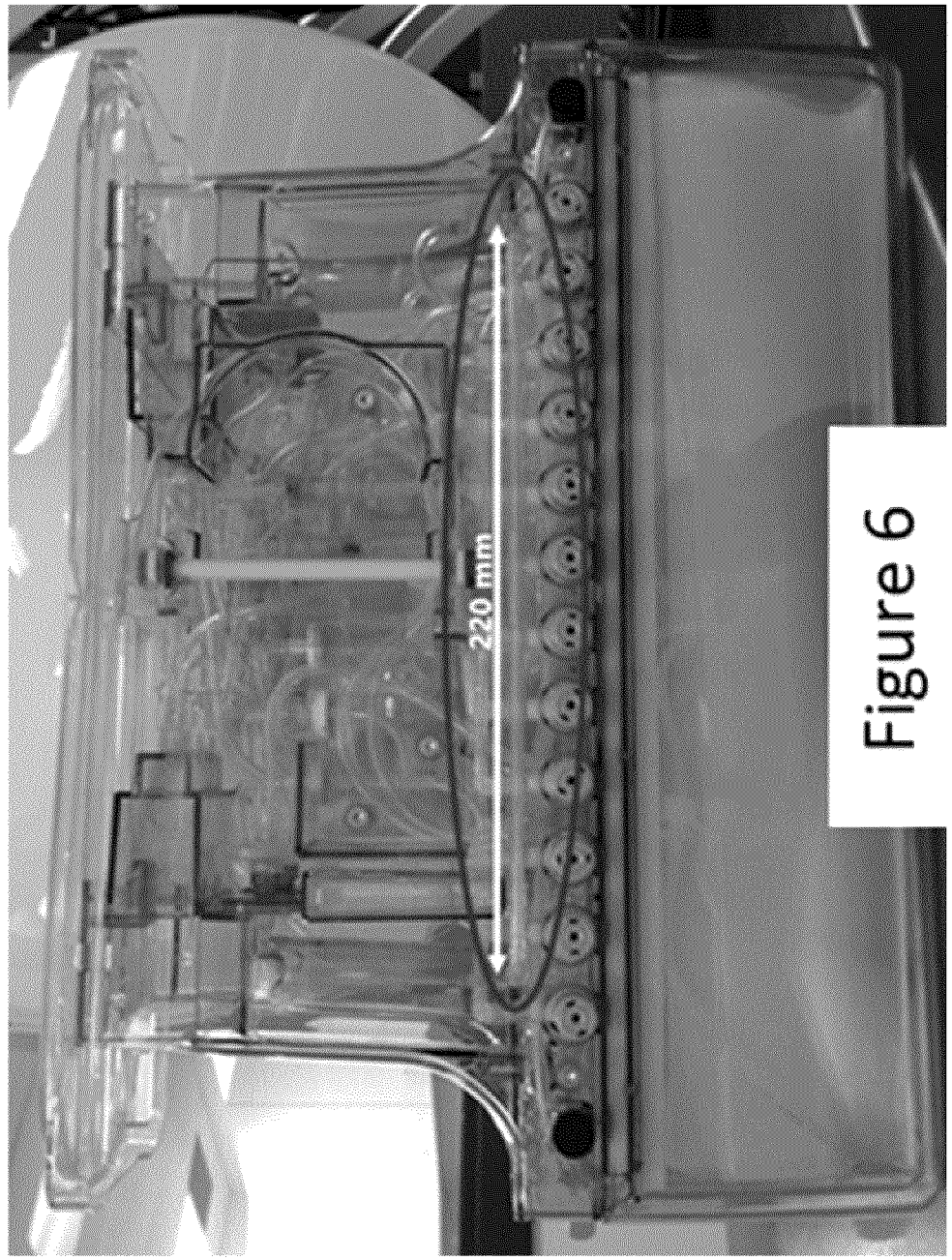

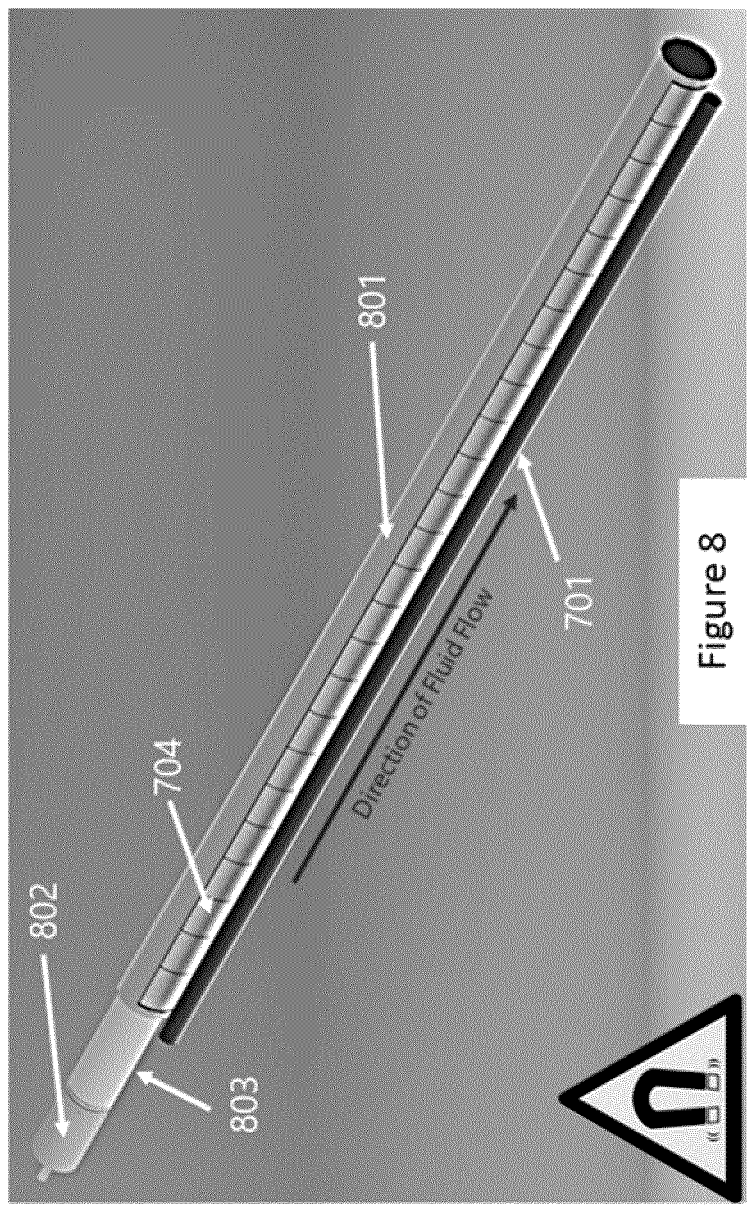

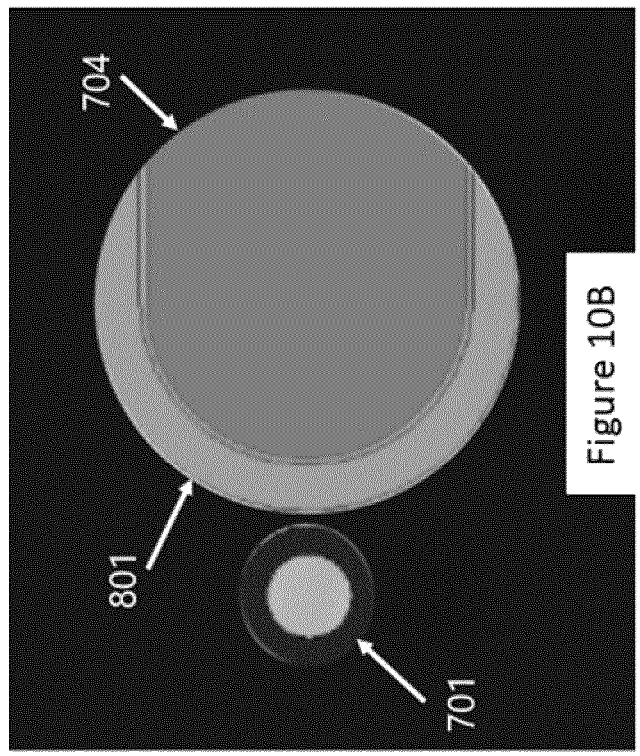
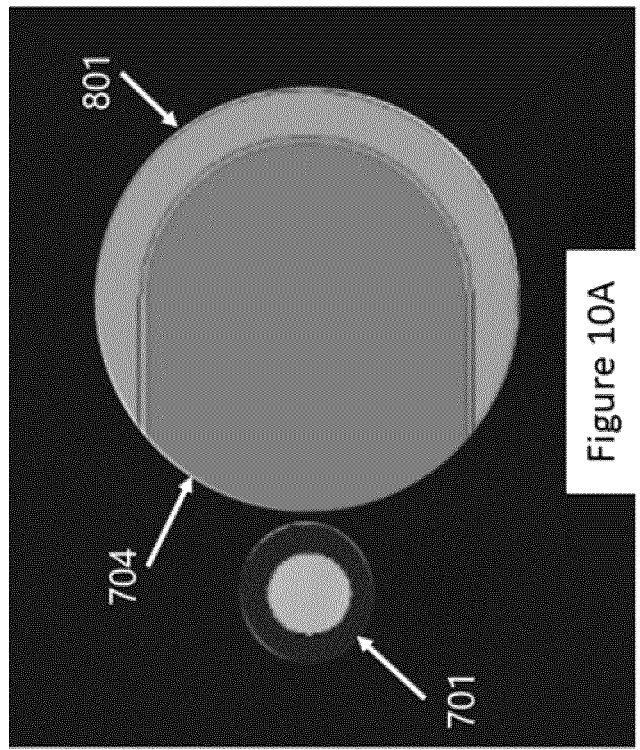

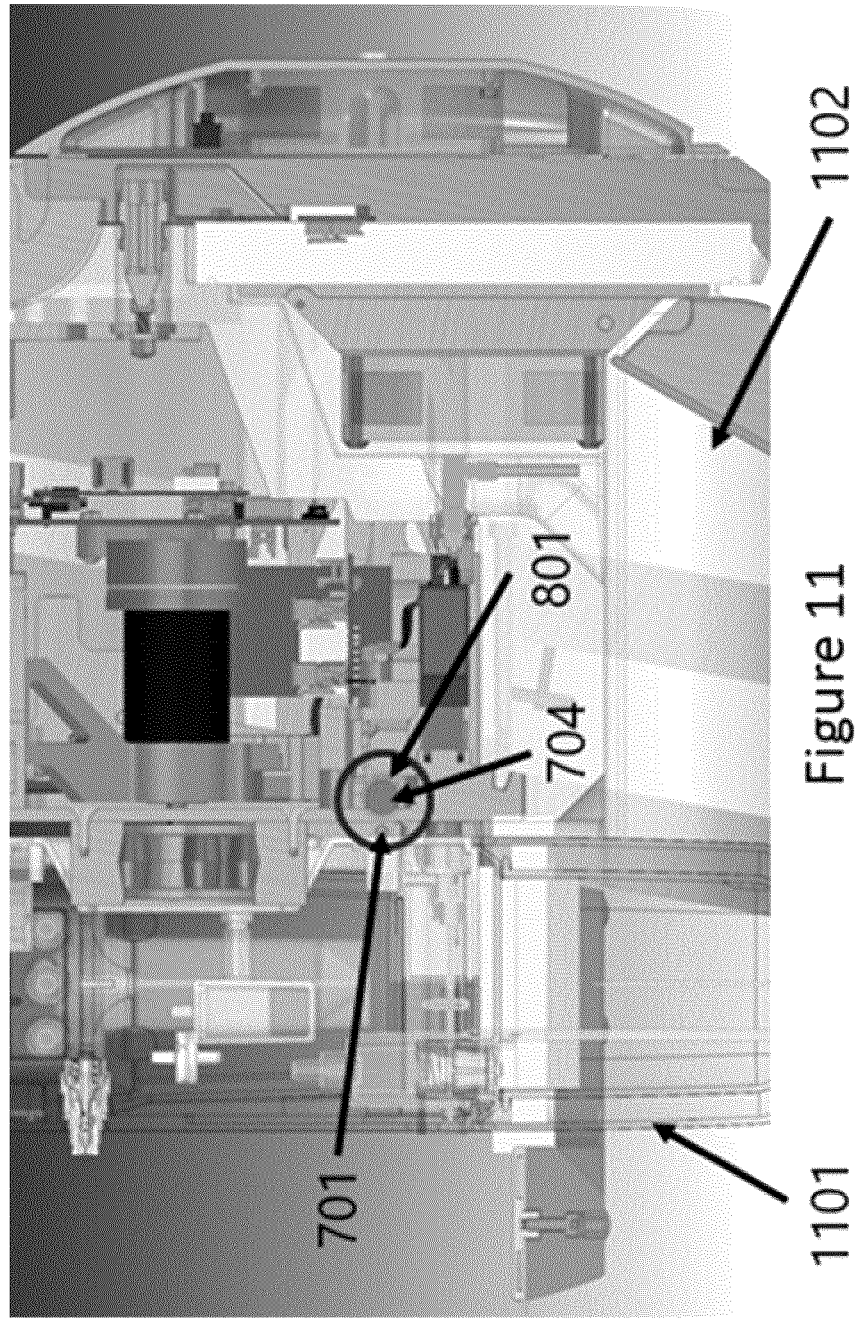

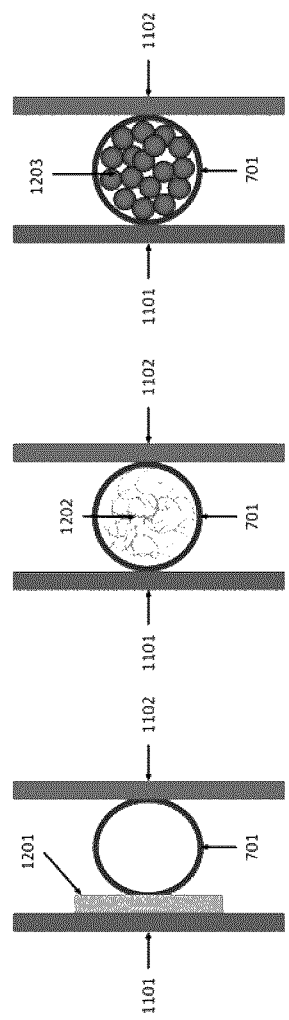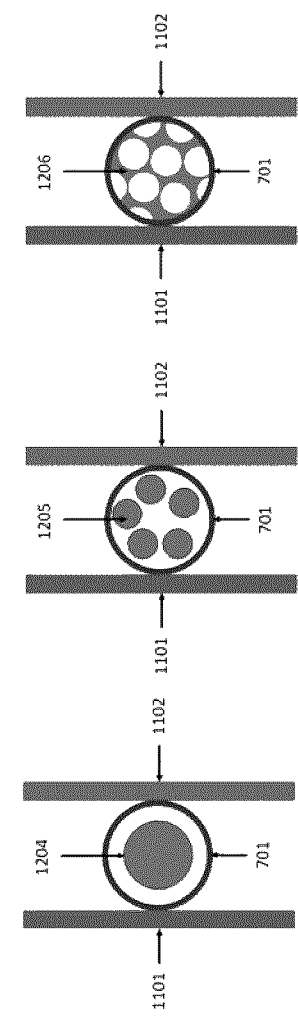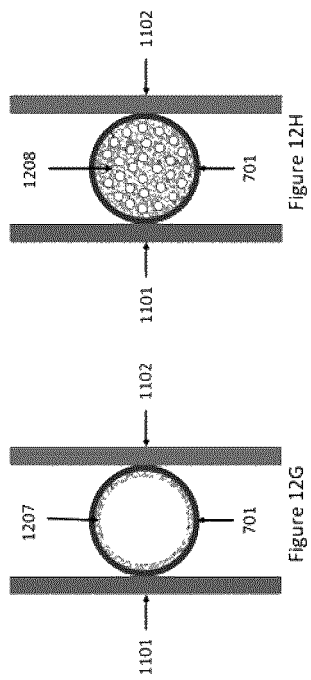

MAGNETIC SEPARATION

FIELD

This invention relates to devices, methods and systems for automated magnetic separation of a target from a biological sample. Such devices, methods and systems find use in a variety of clinical and laboratory settings.

BACKGROUND

Magnetic separation has been utilised as a method to separate magnetic impurities from fluids through the application of a variety of different processes (U.S. Pat. Nos. 3,985,646; 4,054,513; and 5,137,629). Magnetic separation techniques have also been applied to the separation of populations of biological materials using magnetic beads that have been coated with antibodies or polymers to bind to various biological targets, including viruses, bacteria, and cells (U.S. Pat. Nos. 3,970,518; 4,219,411; 4,795,698; and 5,385,707). The biological target can then be extracted from the fluid suspension using one of the previously developed magnetic separation devices described for example in U.S. Pat. Nos. 4,710,472; 5,691,208; 6,193,892; and Zborowski et al., (Journal of Magnetism and Magnetic Materials, vol. 194, pp. 224-230, 1999). The magnetic field generated in the separation device applies a force on the magnetic beads suspended within, which can draw the bead out of fluid suspension, as described in Shevkoplyas et al., (Lab on a Chip, vol. 7, pp. 1294-1302, 2007) and Warnke (IEEE Transactions on Magnetics, vol. 39, issue 3, pp. 1771-1777, 2003) as well as any biological material bound to the magnetic bead. This allows for the desired population to be isolated, by either removing it from the fluid suspension (known as positive selection), or by removing all other populations from the fluid suspension to leave only the non-magnetically bound population of interest (known as negative selection). Isolation of cells, such as T-cells and stem cells, from heterogeneous cell populations is necessary for the development of cell therapies used to treat a variety of diseases.

One system utilizes static suspension within a surrounding magnet (EasySep™ by STEMCELL Technologies®). Other systems that are automated and use magnetic beads to isolate target populations are also known (AutoMACS© from Milytenyi Biotec, and the RoboSep™ from STEMCELL™ Technologies).

There remains an unmet need for rapid and reliable magnetic separation of a selected target within a biological sample where the application of a magnetic field may be automated, customized and controlled for separation of the target with a desired high yield and high purity.

SUMMARY

The present invention provides a method for collecting a target biological population from a biological sample in an automated cell culture system, the method comprising: a. binding the target biological population to magnetic particles; b. circulating the biological sample through one or more fluidics pathways of the automated cell culture system; c. exposing the target biological population bound to the magnetic particles to a magnetic field gradient; d. repeating steps b-c one or more times; and e. collecting the target biological population bound to the magnetic particles.

Also provided herein is a method for collecting a target biological population from a biological sample in an automated cell culture system, the method comprising: a. binding the target biological population to magnetic particles; b. circulating the biological sample through one or more fluidics pathways of the automated cell culture system; c. exposing the target biological population bound to the magnetic particles to a magnetic field gradient to capture the target biological population bound to the magnetic particles; d. circulating un-bound components of the biological sample through one or more fluidics pathways of the automated cell culture system; e. inserting a magnetic field shield/barrier between the target biological population bound to the magnetic particles and the magnetic field to release the target biological population bound to the magnetic particles; f. circulating the target biological population bound to the magnetic particles through one or more fluidics pathways of the automated cell culture system; g. repeating steps b-f one or more times; and h. collecting the target biological population bound to the magnetic particles In additional embodiments, provided herein is a method for collecting a target biological population from a biological sample in an automated cell culture system, the method comprising: a. binding a non-target biological population to magnetic particles; b. circulating the biological sample through one or more fluidics pathways of the automated cell culture system; c. exposing the non-target biological population bound to the magnetic particles to a magnetic field gradient; d. repeating steps b-c one or more times; and e. collecting the target biological population;

In still further embodiments, provided herein is a method for collecting a target biological population from a biological sample in an automated cell culture system, the method comprising: a. binding a non-target biological population to magnetic particles; b. circulating the biological sample through one or more fluidics pathways of the automated cell culture system; c. exposing the non-target biological population bound to the magnetic particles to a magnetic field gradient to capture the non-target biological population bound to the magnetic particles; d. circulating the target of the biological sample through one or more fluidics pathways of the automated cell culture system; e. inserting a magnetic field shield/barrier between the non-target biological population bound to the magnetic particles and the magnetic field to release the non-target biological population bound to the magnetic particles; f. circulating the non-target biological population bound to the magnetic particles through one or more fluidics pathways of the automated cell culture system; g. repeating steps b-f one or more times; and h. collecting the target biological population.

BRIEF DESCRIPTION OF THE DRAWINGS

The following description of typical aspects described herein will be better understood when read in conjunction with the appended drawings. For the purpose of illustrating the invention, there are shown in the drawings aspects which are presently typical. It should be understood, however, that the invention is not limited to the precise arrangements and instrumentalities of the aspects shown in the drawings. It is noted that like reference numerals refer to like elements across different embodiments as shown in the drawings and referred to in the description.

The description herein will be more fully understood in view of the following drawings:

FIG. 1 shows magnetic field gradients used to move magnetic particles;

FIG. 6 shows the incorporation of a magnetic separation tube on a cassette;

FIG. 8 shows a CAD model assembly of the separation tube 701 aligned with magnet array 704, in the "on" position, placed within a magnetic field shield 801 that can be rotated using a motor 802 and gear train 803;

FIG. 10 shows a cross section view of the assembly in the "on" or "off" position;

FIG. 11 shows a full assembly of a cassette 1101 consisting of a separation tube 701 aligned with a cell culture instrument 1102 containing a magnetic separation assembly (704 and 801);

FIG. 12 presents different, non-restrictive methods (parts 1201-1208) to generate localised high magnetic field gradients;

DETAILED DESCRIPTION

Figure 2:
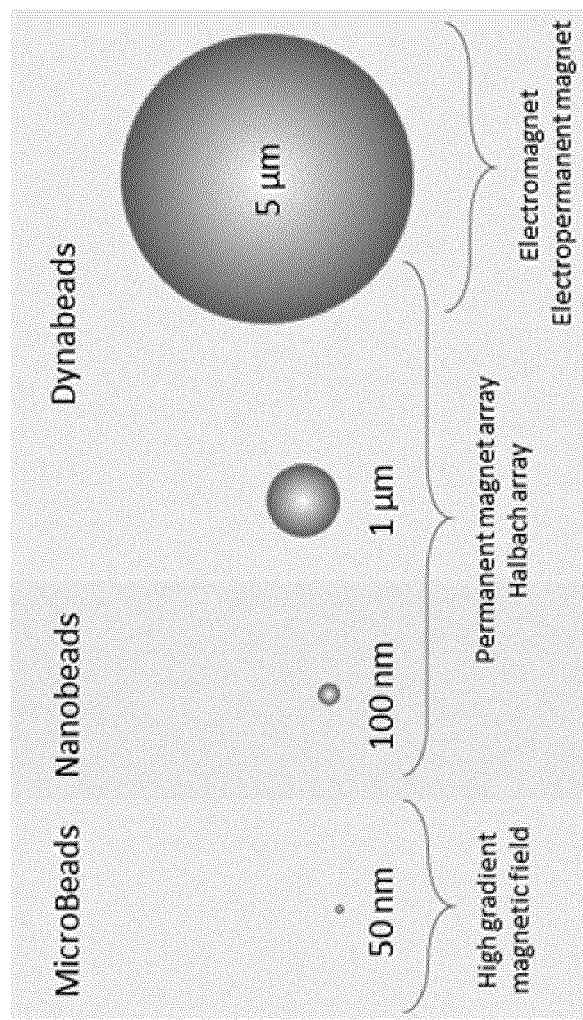
FIG. 2 shows different sized magnetic beads used in cell separation applications.

All publications, patent applications, patents, and other references mentioned herein are incorporated by reference in their entirety. The publications and applications discussed herein are provided solely for their disclosure prior to the filing date of the present application. Nothing herein is to be construed as an admission that the present invention is not entitled to antedate such publication by virtue of prior invention. In addition, the materials, methods, and examples are illustrative only and are not intended to be limiting.

In the case of conflict, the present specification, including definitions, will control. Unless defined otherwise, all technical and scientific terms used herein have the same meaning as is commonly understood by one of skill in the art to which the subject matter herein belongs. As used herein, the following definitions are supplied in order to facilitate the understanding of the present invention.

As used herein, the articles "a" and "an" preceding an element or component are intended to be non-restrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein the terms 'comprises', 'comprising', 'includes', 'including', 'having' and their inflections and conjugates denote 'including but not limited to'.

As used herein, the term "about" modifying the quantity of an ingredient, component, or reactant employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

Should a range of values be recited, it is merely for convenience or brevity and includes all the possible sub-ranges as well as individual numerical values within and about the boundary of that range. Any numeric value, unless otherwise specified, includes also practical close values and integral values do not exclude fractional values. Sub-range values and practically close values should be considered as specifically disclosed values.

It will be understood that any component defined herein as being included may be explicitly excluded from the claimed invention by way of proviso or negative limitation.

As may be used herein the terms 'close', 'approximate' and 'practically' denote a respective relation or measure or amount or quantity or degree that has no adverse consequence or effect relative to the referenced term or embodiment or operation or the scope of the invention.

As may be used herein any terms referring to geometrical relationships such as 'vertical', 'horizontal', 'parallel', 'opposite', 'straight', "lateral", "parallel", "perpendicular" and other angular relationships denote also approximate yet functional and/or practical, respective relationships.

As may be used herein, the terms 'preferred', 'preferably', 'typical', 'typically' or 'optionally' do not limit the scope of the invention or embodiments thereof.

As may be used herein the terms 'substantial', 'appreciable' (or synonyms thereof) denote with respect to the context a measure or extent or amount or degree that encompass a large part or most of a referenced entity, or an extent at least moderately or much greater or larger or more effective or more important relative to a referenced entity or with respect to the referenced subject matter.

As may be used herein the terms 'negligible', and 'slight' (or synonyms thereof) denote, a sufficiently small respective relation or measure or amount or quantity or degree to not have practical consequences relative to the referenced term and on the scope of the invention.

As used herein the term 'may' denotes an option or an effect which is either or not included and/or used and/or implemented and/or occurs, yet the option constitutes at least a part of some embodiments of the invention or consequence thereof, without limiting the scope of the invention.

As used herein a "sample" can be any sample and can be a "biological sample" that may be derived from plant, human, animal, or microorganism sources. The sample is typically a heterogeneous sample from which a target is selected for separation and collection. Targets may be cells, DNA, RNA, proteins, peptides, microorganisms, viruses and so forth. A biological sample contains a target population.

The biological sample may comprise a body fluid sample, a body cell sample or a biological tissue sample. Examples of biological or body fluid samples include urine, lymph, blood, plasma, serum, saliva, cervical fluid, cervical-vaginal fluid, vaginal fluid, breast fluid, breast milk, synovial fluid, semen, seminal fluid, stool, sputum, cerebral spinal fluid, tears, mucus, interstitial fluid, follicular fluid, amniotic fluid, aqueous humor, vitreous humor, peritoneal fluid, ascites, sweat, lymphatic fluid, lung sputum and lavage or samples derived therefrom. Biological tissue samples are samples containing an aggregate of cells, usually of a particular kind, together with intercellular substances that form one of the structural materials of a human, animal, plant, bacterial, fungal or viral structure, including connective, epithelium, muscle and nerve tissues. Examples of biological tissue samples also include organs, tumors, lymph nodes, arteries and individual cell(s). For example, the sample can be a tissue sample suspected of being cancerous. Biological tissue samples may be first treated to separate aggregates of cells.

In embodiments, the biological sample is a blood cell, white blood cell or platelet. White blood cells (leukocytes) include neutrophils, lymphocytes (T cells inclusive of T helper cells, cytotoxic T cells, T-killer cells, Natural Killer, and B lymphocytes), monocytes, eosinophils, basophils, macrophages, and dendritic cells.

As used herein, "target cells" are cells typically intended for separation or concentration from other cells (such as for examination or diagnosis), of particular type or having distinct characteristics relative to other cells, such as selective mutual affinity to couple with certain antibodies or other compounds or other particles. In particular embodiments, a distinct characteristic is selective affinity to couple or bind with magnetic beads to form magnetic target cells.

As used herein, the term "patient sample" is defined as a biological sample taken from any animal for whom diagnosis, screening, monitoring or treatment is contemplated. Animals include mammals. A patient refers to a subject such as a mammal, primate, human or livestock subject afflicted with a disease condition or for which a disease condition is to be determined or treated. A patient sample may be the source of a source biological population.

As used herein the term "antibody" is intended to include polyclonal and monoclonal antibodies of any isotype (IgA, IgG, IgE, IgD, IgM), or an antigen-binding portion thereof, including, but not limited to, F(ab) and Fv fragments such as sc Fv, single chain antibodies, chimeric antibodies, humanized antibodies, recombinant engineered antibody and a Fab expression library. Bispecific antibodies can also be immobilized on a magnetic particle.

As used herein, a "label moiety" is detectable, either directly or indirectly. The label moiety can be a detectable label and can be used in conjunction with magnetic particles. Direct label moieties include radioisotopes; enzymes whose products are detectable (e.g., luciferase, B-galactosidase, and the like); fluorescent labels (e.g., fluorescein isothiocyanate (FITC), rhodamine, phycoerythrin, a cyanine dye, Cascade Blue, PerCP, Cy5, Cy7, allophycocyanin (APC), PECy5 or other tandem conjugates of different fluorochromes, Texas Red, and the like); fluorescence emitting metals, e.g., 152', or others of the lanthanide series, attached to the protein through metal chelating groups such as EDTA; chemiluminescent compounds, e.g., luminol, isoluminol, acridinium salts, and the like; bioluminescent compounds, e.g., luciferin, aequorin (green fluorescent protein), and the like; and metallic compounds. Indirect label moieties include labeled molecules that bind to the polypeptide, e.g., antibodies specific for the polypeptide, wherein the labeled binding molecule is labeled as described above; and members of specific binding pairs, e.g., biotin, (a member of the specific binding pair biotin-avidin), digoxigenin (a member of the specific binding pair digoxigenin-antibody to digoxigenin) and the like. Alternatively, the label moiety can be any suitable label including but not limited to those described herein.

Magnetic particles labeled with a binding partner such as an antibody, a protein, or a nucleic acid molecule are commercially available from Miltenyi Biotec GmbH (Friedrich Ebert Str. 68, D-51429 Bergisch Gladbach, Germany). Methods for magnetically labeling a biomolecule are known in the art; any known method can be used. For example, U.S. Pat. No. 6,020,210 describes methods for preparation of magnetic particles, and attachment of biomolecules thereto. A first member of a specific binding pair can be associated with a magnetic particle, wherein the biomolecule to be modified comprises a moiety that binds to the member of the specific binding pair. Alternatively, the magnetic particle is coupled, e.g. to the antibody or the immunologically reactive fragment thereof, through a linker or a spacer (such as, e.g., a nucleic acid linker). Addition of spacers or linkers will allow biomolecules to be presented in a more flexible fashion, and careful chemistry can attach ligands in a specific orientation. There are numerous chemistries used for these couplings as many companies have published protocols and will help the artisan skilled in the art with the chemistry.

Examples of members of specific binding pairs that can be attached to a magnetic particle include, but are not limited to, oligo dT (for binding to nucleic acid molecules comprising, e.g., a poly-A tract at the 3' end); oligonucleotides having a specific nucleotide sequence (for binding to nucleic acid molecules comprising a complementary nucleotide sequence); avidin (e.g., streptavidin) (for binding to a biotinylated biomolecule); an antigen-binding polypeptide, e.g., an immunoglobulin (Ig) or epitope-binding fragment thereof (for binding to a biomolecule comprising an epitope recognized by the Ig); polynucleotide binding proteins (for binding to a polynucleotide), e.g., a transcription factor, a translation factor, and the like; Ni or Co chelate (to immobilize poly-histidine-tagged proteins); receptor-ligand systems, or other specific protein-protein interacting pairs; aptamers (e.g., nucleic acid ligands for three-dimensional molecular targets); lectins (for binding glycoproteins); lipids and phospholipids (binding to lipid-binding proteins), e.g., phosphatidyl serine and annexin V. Those skilled in the art will recognize other members of specific binding pairs that may be attached to a magnetic particle.

A biomolecule can also be coupled (covalently or non-covalently) to a magnetic particle by direct chemical conjugation or by physical association. Such methods are well known in the art. Biochemical conjugations are described in, e.g., "Bioconjugate Techniques" Greg T. Hermanson, Academic Press. Non-covalent interactions, such as ionic bonds, hydrophobic interactions, hydrogen bonds, and/or van der Waals attractions can also be used to couple a biomolecule with a magnetic particle. For example, standard non-covalent interactions used to bind biomolecules to chromatographic matrices can be used. One non-limiting example of such a non-covalent interaction that can be used to bind a biomolecule to a magnetic particle are DNA binding to silica in the presence of chaotropic salts. Those skilled in the art are aware of other such non-covalent binding and conditions for achieving same. See, e.g., Molecular Cloning, Sambrook and Russell, Cold Spring Harbor Laboratory Press.

As used herein "magnetic particles" are used as labels for biomolecule targets in a biological sample such as, but not limited to, antibodies, DNA, polypeptides and cells to aid in their separation from complex mixtures of a sample. Magnetic particles may be classified according to size: microbeads that are about <50 nm; nanobeads that are about 100 to about 200 nm; and dynabeads that are about 1-5 µm. Furthermore, magnetic particles can be adapted for selective affinity (functionalized) for coupling or binding with a desired biomolecule target such as with a fluorescent label, antibody, nucleic acid and so forth.

Different magnetic particles are available from a number of sources, including for example, Dynal (Norway), Advanced Magnetics (Cambridge, Mass., U.S.A.), Immuncon (Philadelphia, U.S.A.), Immunotec (Marseilles, France), and Miltenyi Biotec GmbH (Germany). Preferred magnetic labeling methods include colloidal superparamagnetic particles in a size range of 5 to 200 nm, preferably in a size of 10 to 100 nm. These magnetic particles allow a quantitative magnetic labeling of cells, thus the amount of coupled magnetic label is proportional to the amount of bound product. Colloidal particles with various specificities are available, for example, through Miltenyi Biotec GmbH.

As used herein "separation" includes isolation or collection accumulation of target cells from a surrounding fluid bulk, where the bulk is, for example, a fluidic mixture or suspension of emulsion of cells or a combination thereof, implying also concentration or enrichment of target cells relative to the surrounding bulk or a provided sample of cells (obtaining a precipitate in analogy to precipitation or centrifugation).

As used herein "depletion" with respect to separation, is the removal of target cells from the bulk (obtaining a supernatant in analogy to precipitation or centrifugation).

As used herein "high qualitative" (separation, depletion) is meaning high purity, separation of target cells substantially exclusive of other cells, or comprising negligible amounts of other cells such as between about 10% and about 1% or less of the separated cells, and conversely a depletion.

As used herein "high quantitative" (separation, depletion) is meaning high recovery, separation of substantially all the target cells, or very high amount of the target cells from the sample, such as between about 80% to about 99% or more or the separated cells, and conversely a depletion.

It is noted that whenever a reference is made herein to cells attaching or sticking or adhering to a wall of a tube, or similar terms to that effect, it does not necessarily mean that the cells attach directly to the wall, but rather, that they also connect or link or are attracted indirectly to the wall such as by chains of cells or groups of cells.

As used herein "magnetic shielding" reduces and/or blocks the magnetic field in a space by blocking the field with a "magnetic field shield" (also referred to herein as a magnetic field shield/barrier, with both terms being interchangeable).

As used herein "HMPSM" denotes a high magnetic permeability and saturation material that results in a highly concentrated magnetic field within itself that effectively reduces and/or eliminates the influence of the magnetic field.

As used herein "magnetic field shield/barrier" is a structure that can be controlled with respect to use with a magnetic field.

As used herein an "electromagnet" is a type of magnet in which the magnetic field is produced by an electric current. The magnetic field disappears when the current is turned off. Electromagnets usually consist of wire wound into a coil. A current through the wire creates a magnetic field which is concentrated in the hole in the center of the coil. The wire turns are often wound around a magnetic core made from a ferromagnetic or ferrimagnetic material such as iron; the magnetic core concentrates the magnetic flux and makes a more powerful magnet.

As used herein a "permanent magnet is a magnet that is permanent, in contrast to an electromagnet, which only behaves like a magnet when an electric current is flowing through it. Permanent magnets are made out of substances like magnetite ($Fe_3O_4$), the most magnetic naturally occurring mineral, or neodymium, a powerfully magnetic synthetic substance.

As used herein "magnet array" is one or more magnets. The one or more magnets can be permanent magnets or electromagnets. One or more permanent magnets may be in a linear array, in different sizes, different strengths, configured in opposite pole directions perpendicular to the axis of the linear array or configured with 90° rotations to one another in a plane perpendicular to the axis of the linear array. Any number of magnets in the array may be physically held together or adhesively held together. Permanent magnets may be of a material selected from iron, neodymium, samarium-cobalt or alnico.

A general non-limiting overview of the invention and practising the invention is presented below. The overview outlines exemplary practice of embodiments/aspects of the invention, providing a constructive basis for variant and/or alternative and/or divergent aspects/embodiments, some of which are subsequently described.

The present disclosure relates to devices, methods and systems for magnetically separating and collecting a desired biomolecule target in a biological sample through positive or negative selection. As presented herein, a magnetic field is produced that is substantially adjacent to a biological sample containing a desired magnetized biomolecule target. The magnetic field can be switched "ON" and "OFF" in an automatic manner such to provide a magnetic field of a desired strength, continuous time duration, intermittent duration, pulsatile duration and combinations thereof. This is achieved by the introduction of a magnetic field shield (also referred to herein as a magnetic field shield/barrier) to functionally control the application of the magnetic field encountered/applied to the biological sample. The magnetic field shield/barrier is positioned between the source of the magnetic field and the biological sample and as a function of its high magnetic permeability and saturation materials (HMPSM), results in a highly concentrated magnetic field within itself that effectively reduces and/or eliminates the influence of the magnetic field on the biological sample containing the magnetized biomolecule target.

In an aspect of the invention, cellular biologic material is cultured in a bioreactor vessel, and a desired cell is the biomolecule target for magnetic separation and collection.

The devices, methods and systems herein described generally employ an approach whereby a biological sample (a heterogeneous biological population), which is typically, but not limited to, cells, has magnetic beads bound to a specific biomolecule target (a specific cell type) in the sample creating a "magnetized cell". Typical binding methods may include: i) direct binding of a magnetic bead that is conjugated to an antibody of the biological target; and ii) using a multi-step process where the biological target is bound to an antibody that is conjugated with another antigen or binding pair. This antigen/binding pair is then bound to the magnetic bead which is conjugated to the respective antibody/binding pair. During magnetic separation, the magnetized cells which are the target cells attached to the magnetic beads (expressing the antigen; positively selected) are attracted to a location near the magnet, while cell populations not attached to beads (negatively selected) remain in the media of the biological sample and are easily removed from the bound population. An alternative process to magnetic cell selection is the use of antigen-presenting magnetic microbeads to stimulate some type of biological process on the target (such as T cell activation with anti-CD3 and anti-CD28 coupled to magnetic activation beads). After stimulation, the magnetic beads must be removed prior to downstream processing, which requires treatment of the cell suspension with an effective magnet.

Figure 3:
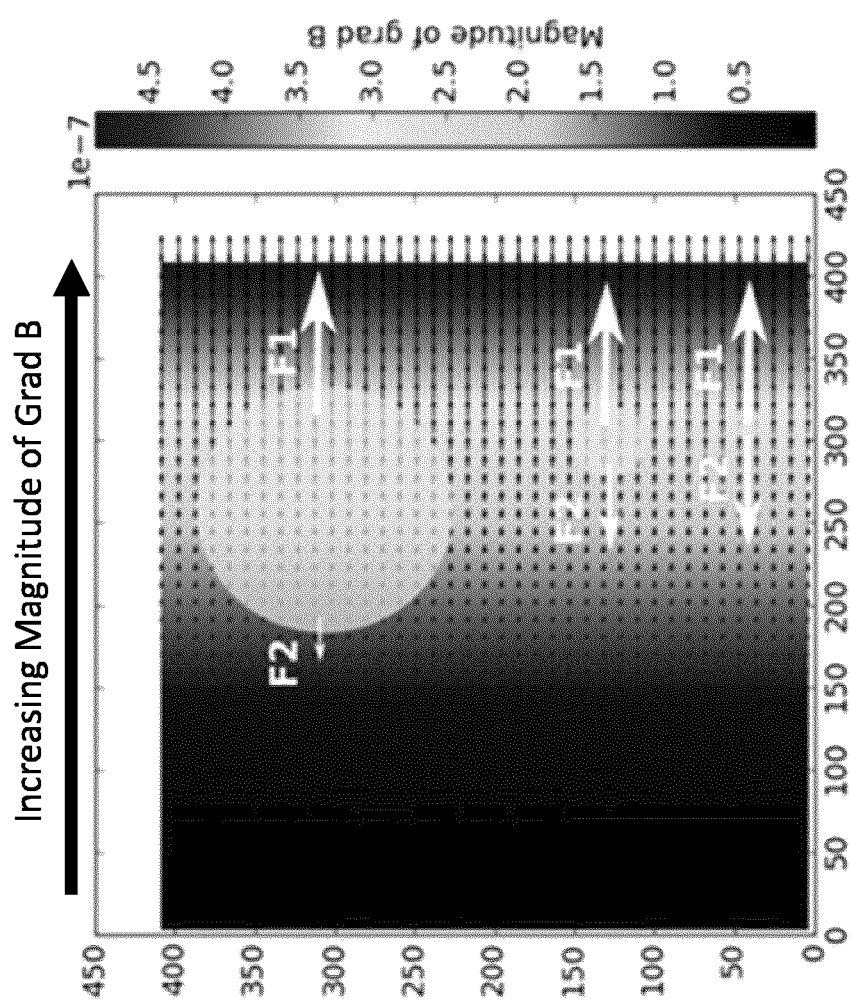
FIG. 3 shows effect of bead size on net magnetic force acting on the bead in response to a magnetic field gradient.

During separation, a magnetically inclined particle experiences a force vector, F, from an applied magnetic field, B, acting on a paramagnetic particle as defined by equation 1 below (Pamme, 2006).

$$F = \frac{V \cdot \Delta \chi}{\mu_0} (B \cdot \nabla) B \quad (1)$$

Where V is the volume of the particle, $\Delta \chi$ is the difference in magnetic susceptibility (capacity to become magnetized) of the particle and the surrounding media, $\mu_0$ is the magnetic permeability of a vacuum, and $B \cdot \nabla$ is the dot product between the magnetic field and the gradient operator. From this equation, clearly the success of a magnetic separation system is dependent on a number of parameters. First, particle size, where larger particles experience a stronger magnetic force. There are 3 typical size classifications for magnetic particles, i) <50 nm (e.g. MACS® MicroBeads by Miltenyi Biotec), ii) 100-200 nm (e.g. Nanobeads by BioLegend®), or iii) 1-5 µm (e.g. Dynabeads® by Invitrogen), which are more easily separated with increasing size. Next, increasing the magnetic susceptibility of the bead relative to the surrounding media. Since most beads typically consist of an iron core, and the surrounding media is practically not magnetisable, this value is typically relatively large already. Finally, increasing the magnetic field gradient can drastically increase the force applied to a magnetic bead. This is because a magnetic field gradient generates uneven forces on the North and South poles of a magnetic particle, due to the uneven spatial quality of the high-gradient field (FIG. 1A). This uneven force on a particle leads to particle movement. In a perfectly homogeneous magnetic field, equal and opposite forces are generated on the two poles of the magnetic particle, leading to zero net force on the particle and no net movement (FIG. 1B). Furthermore, with larger sized magnetic particles, the difference of magnetic force applied from the gradient is larger between the two poles compared to a smaller bead (FIGS. 2 and 3).

Figure 4A:
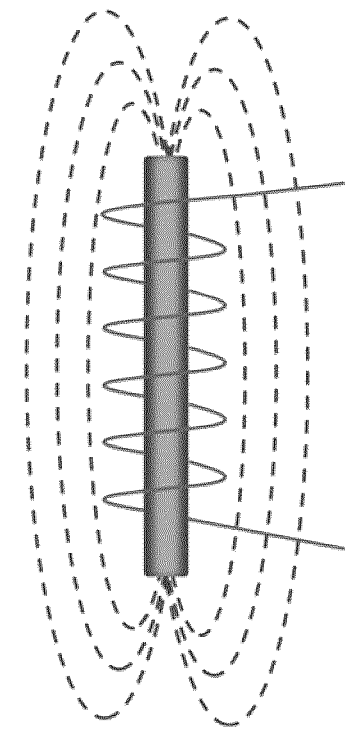
FIG. 4 shows different conceptual methods for producing an automatically controlled magnetic field.
Figure 4B:
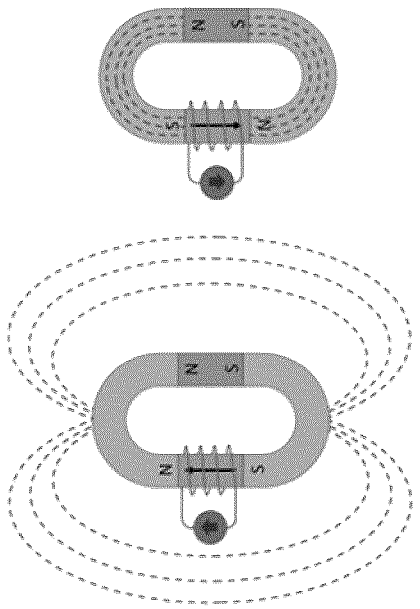

There are means to induce a "switchable" (can be turned on and off) magnetic field that can generate a gradient to attract magnetic beads for automated separation, isolation and collection. For instance, electromagnets are formed by winding a current carrying wire around a rod of magnetically susceptible material (e.g. iron) (FIG. 4A). These can be switched on or off by applying or removing the current through the wire respectively. Another method is an electropermanent magnet, which consists of a hard magnet with a high magnetic coercivity (high magnetic field to switch the magnet poles), and a soft magnet with a low coercivity (FIG. 4B). Both magnets are connected to each other with a paramagnetic material (such as iron) to complete the magnetic circuit. The soft magnet is wrapped in a current carrying wire and, by pulsing a strong current in the wire, the magnetic poles of the soft magnet can be switched. When the poles are mis-aligned, the magnetic "current" flows through the paramagnetic material, and no external magnetic field is observed. However, when the poles are aligned, the magnetic current travels through the air, and an external magnetic field is generated. A final method is the use of permanent magnets to generate the magnetic field. By using a material with a high magnetic saturation, it is possible to block the magnetic field on one side of the magnet (FIG. 4C).

Figure 4C:
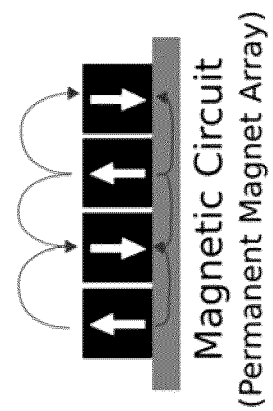
Figure 4D:
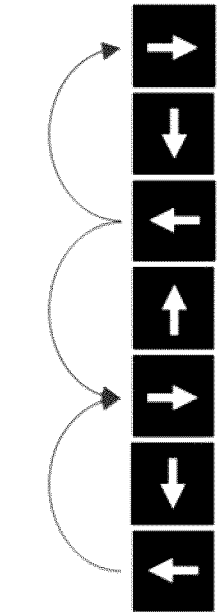

In an aspect of the invention, an array of strong permanent magnets with alternating orientations are used (FIG. 4C). This creates strong magnetic gradients radially from the array, as well as gradients linearly along the axis of the array. A modification of this design is a Halbach array, where magnets in an array are rotated 90° with respect to each other (FIG. 4D). This induces a significant increase in the magnetic field on one side of the magnet, while diminishing it on the other side (Kang et al.).

The controllable magnetic field can be designed to perform the sequential activities of controlling the isolation of targeted biological fractions containing the biomolecule target (either through positive or negative selection) while simultaneously enabling non-targeted biological fractions to be removed and discarded.

During the processing of biological samples using magnetic separation, the ability to switch the magnetic field on and off, thereby enabling automation of both positive and negative cell selection, is a major operational requirement. The devices and methods described herein enable the automated collection of target biological populations thereby reducing overall process complexity and reducing operational costs.

The "on" and "off" switchable magnetic field described herein is by the introduction of a magnetic field shield/barrier to control the magnetic field encountered by a biological sample labelled with magnetic particles such as magnetic beads. Through this controllable magnetic field, the sequential steps of target biological retention followed by secondary release and capture enables the production of magnetic separation systems that are very compact and energy efficient.

The magnetic field shield/barrier is functional by the inherent properties of HMPSM. This high magnetic permeability and saturation results in a highly concentrated magnetic field within this material. The deployment of a HMPSM as a magnetic field shield/barrier between the source of the magnetic field and the biological sample enables the practical elimination of the influence of the magnetic field on the biological sample. Through this controllable activation of the magnetic barrier, the magnetic separation of target populations from biological samples can be achieved with high reproducibility and relatively low cost.

FIG. 1 presents the theory as to how magnetic particles/beads (such as those used for cell separation and activation) respond to a magnetic field gradient. This is mathematically exemplified in equation 1. Each magnetic bead has a North and South pole. When exposed to a magnetic field gradient, the magnetic forces (one attractive, one repulsive) acting on each pole of the particle will be different, resulting in a net force that can move the particle (FIG. 1A). In comparison, when there is no magnetic field gradient, the forces acting on each pole will be equal and opposite (FIG. 1B). Therefore, no net force will be applied to the magnetic particle, and no motion will be induced. Arrays of magnets arranged such that the poles are alternated between North (N) and South (S) can be used to generate these necessary magnetic field gradients. Furthermore, as shown in FIG. 1C, high magnetic field gradients can be generated by using arrays of multiple strong, small magnets arranged with poles with alternative North to South direction in the array.

FIG. 2 presents the sizes of magnetic beads typically used for the magnetic separation of cells. There is a range of bead sizes that currently exist, ranging from about 50 nm MACS® MicroBeads by Miltenyi up to about 5 μm Dynabeads® by Invitrogen. Increasing bead size typically increases the susceptibility of a bead to respond to a magnetic field due to the increased difference of forces acting on each pole of the bead.

FIG. 3 outlines a method whereby larger-sized magnetic beads are more efficiently forced out of a fluid in response to an induced magnetic field. In some embodiments, beads are exposed simultaneously to an attractive force and a repulsive force from the magnetic field on each of the beads respective poles. Moving away from the magnetic field source, the magnitude and the gradient of the magnetic field decreases. The net force that the bead experiences is, therefore, dependent on the distance from the source of the magnetic field, and the diameter of the bead. Larger beads have a larger distance between both poles, resulting in a larger difference in magnetic force acting on the poles. Similarly, a stronger gradient (i.e. closer to the magnet) scales the difference of the forces acting on the respective poles of the bead. This increase in net force results in more rapid attraction of the bead towards the magnet and out of the fluid.

FIG. 4 presents methods to develop a magnetic field that can be turned on/off with respect to application to a biological sample using an automatic control system. In FIG. 4A, an electromagnet is presented, where wire is wrapped around a ferromagnetic material, such as iron. By applying a current to the wire, the magnetic field can quickly and easily be turned on and, conversely, off. However, the magnetic field generated from this would be low. Furthermore, electromagnets produce significant levels of heat, which is significantly problematic for the local cell culture environment. FIG. 4B presents an electro-permanent magnet consisting of both a non-switchable rare earth magnet, and a pole switchable Alnico permanent magnet, both set in a ferromagnetic material forming a magnetic circuit. When the poles of the permanent magnets are aligned, the carbon steel adopts the same orientation, producing a net magnetic flux in the air surrounding the magnet (which can be used to pull a magnetic bead out of fluid suspension). When the poles of the two permanent magnets are opposite, however, the magnetic flux is confined to the ferromagnetic material, preventing the extraction of magnetic beads. The orientation of the Alnico magnet is switched by applying a very high magnitude and short duration pulse of current through the coil of wire surrounding it, thereby producing a high-magnitude, transient magnetic field. The magnetic gradient generated from such a setup would, however, also be quite low compared to a rare earth magnet, and this method would also produce electromagnetic interference that could have unknown adverse impacts on any surrounding electronics. FIG. 4C presents an array of permanent magnets with reversing pole orientations, with a HMPSM, such as iron, cobalt iron, and Hiperco 50, on one side. By utilising this HMPSM, the magnetic flux of the magnetic field will be amplified on the opposite side, while being diminished to negligible levels on the side with the HMPSM. By actuating the HMPSM such that it lies between the permanent magnets and magnetic beads, the force acting on the beads can be reduced to effectively zero. Conversely, moving the HMPSM to the opposite side of the permanent magnet, a very strong magnet force can be induced on the bead. Finally, in FIG. 4D a Halbach linear array is presented where 90° rotations of the magnets allows for the generation of an amplified magnetic field on one side of the array, while a significantly diminished or abolished field on the opposite side of the array.

Figure 5:
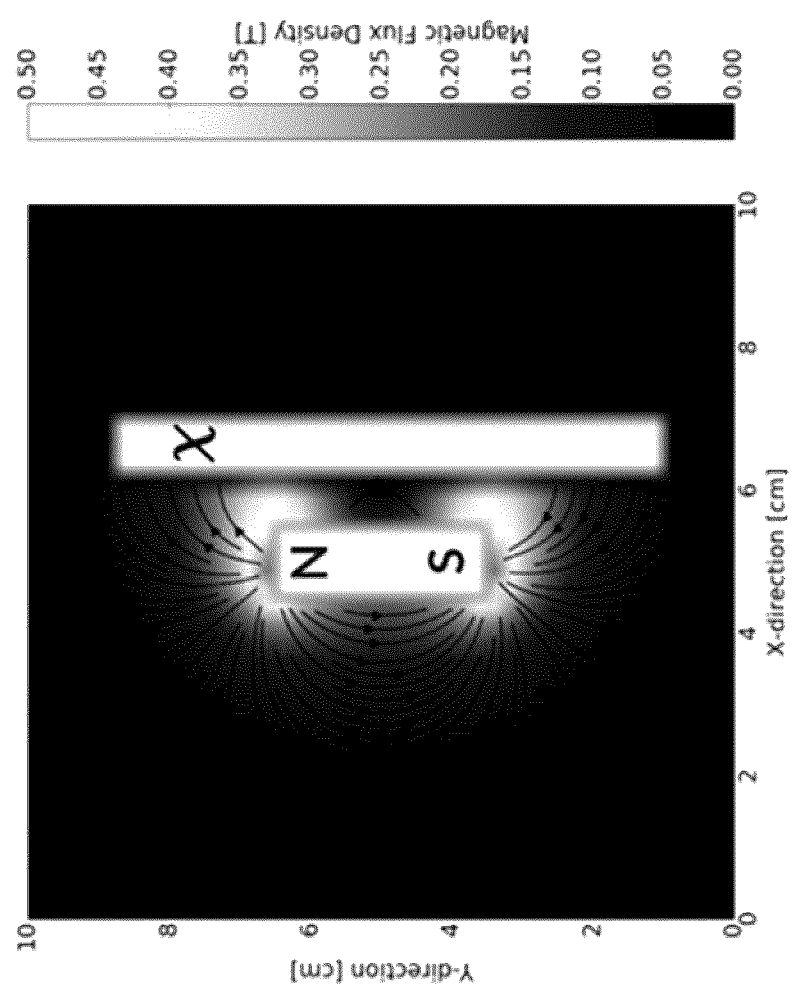
FIG. 5 shows a computational model of the ability of a high magnetic permeability and saturation material to block the magnetic flux density.

FIG. 5 presents computational modeling demonstrating the function of the HMPSM (labeled x) on a permanent magnet. The magnetic flux primarily transmits through the air surrounding the magnetic. However, the magnetic flux is not strong enough to transmit through the HMPSM. This results in no significant magnetic flux density on the opposite side of the HMPSM to the magnet, while the flux density is primarily amplified at the two poles of the permanent magnet.

FIG. 6 demonstrates the layout of an example cassette typically used within an automated cell culture system with a separation tube for magnetic separation using magnetic beads running along the length of the cassette face. This tube aligns with a permanent magnet array located within the automated cell culture system. The separation tubing is connected to various tubing and bags within the cassette that are used for either positive or negative binding of the cells of interest. The use of as long a tube as possible increases the volume that can be loaded into the separation tubing, thereby reducing the processing time for magnetic separation to occur.

Figure 7B:
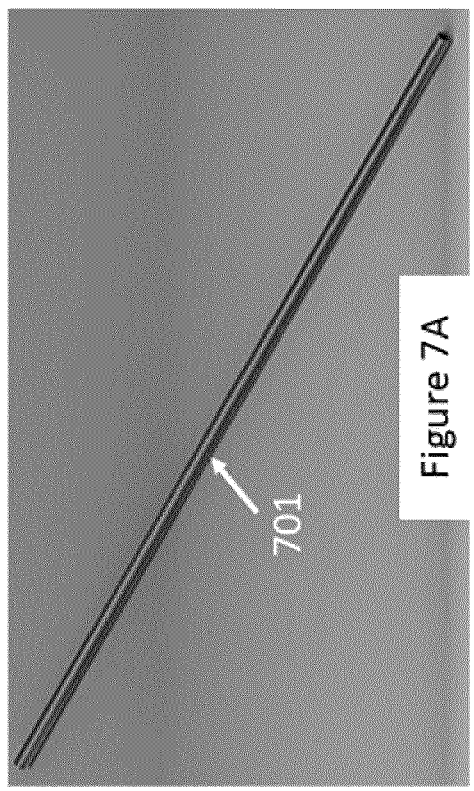
FIG. 7 shows Computer Aided Design (CAD) models of the separation tube 701 aligned with a magnet array 704 consisting of rare earth magnets with alternating poles 702 and 703.
Figure 7A:
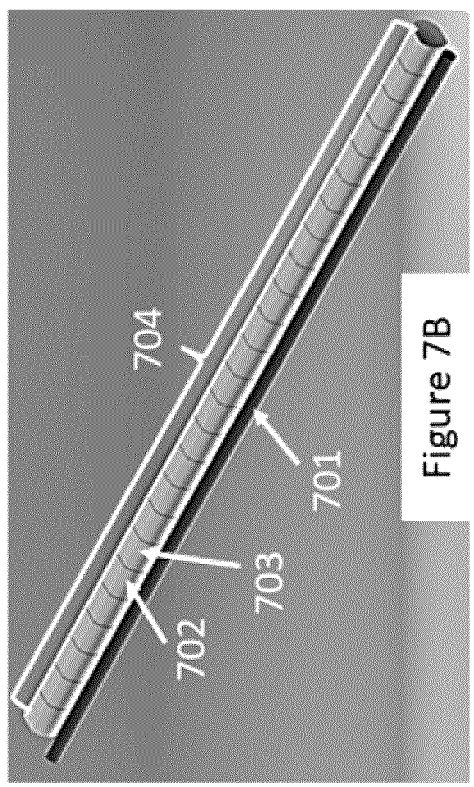

FIG. 7 provides an embodiment of the separation process presented in FIG. 6. Magnetically bound beads either attached or unattached to cells can be loaded into the separation tube 701 (FIG. 7A). In some aspects the separation tube 701 is aligned with the permanent magnet array 704 as presented in FIG. 7B. In other aspects the separation tube 701 is aligned with an electromagnet that replaces the permanent magnet array 704. The permanent magnet array 704 consists of permanent magnets with alternating North (702) and South (703) poles to generate as high a magnetic flux gradient as possible. Magnetic beads in the separation tube 701 are attracted by the magnet array 704, thus successfully separating out the magnetic beads from the fluid suspension.

FIG. 8 presents an embodiment of the magnetic field shield/barrier with the magnetic field turned "on". The separation tube 701 runs along the length of the permanent magnet array 704. Surrounding a portion of the permanent magnet array 704 is a magnetic field shield 801 (shown as a paramagnetic sheath 801) produced from an HMSPM. In some aspects the magnetic field shield 801 is produced from pure iron. In some aspects the magnetic field shield 801 is produced from a soft magnetic iron alloy, such as ferritic steel, silicon iron, nickel iron, or cobalt iron. In some aspects the magnetic field shield 801 is produced from a soft-magnet alloy of cobalt, vanadium, and iron such as an alloy of about 49% cobalt, about 2% vanadium, and the balance iron. In some aspects the sheath 801 can be produced from Hiperco50 or Hiperco 50 A. In some aspects the paramagnetic properties of the magnetic field shield 801 amplifies the magnetic field gradient applied to the separation tube 701 by the magnet array 704. This, in effect, increases the magnetic force acting on the magnetic beads allowing them to be more effectively removed from fluid suspension, while non-magnetic matter will not be affected and will be able to pass through the separation tubing unimpeded. The permanent magnet array 704 and magnetic field shield 801 are also connected to a servo 802 and a gear train 803, allowing the entire assembly to be completely rotated, and turned off and on as needed.

Figure 9:
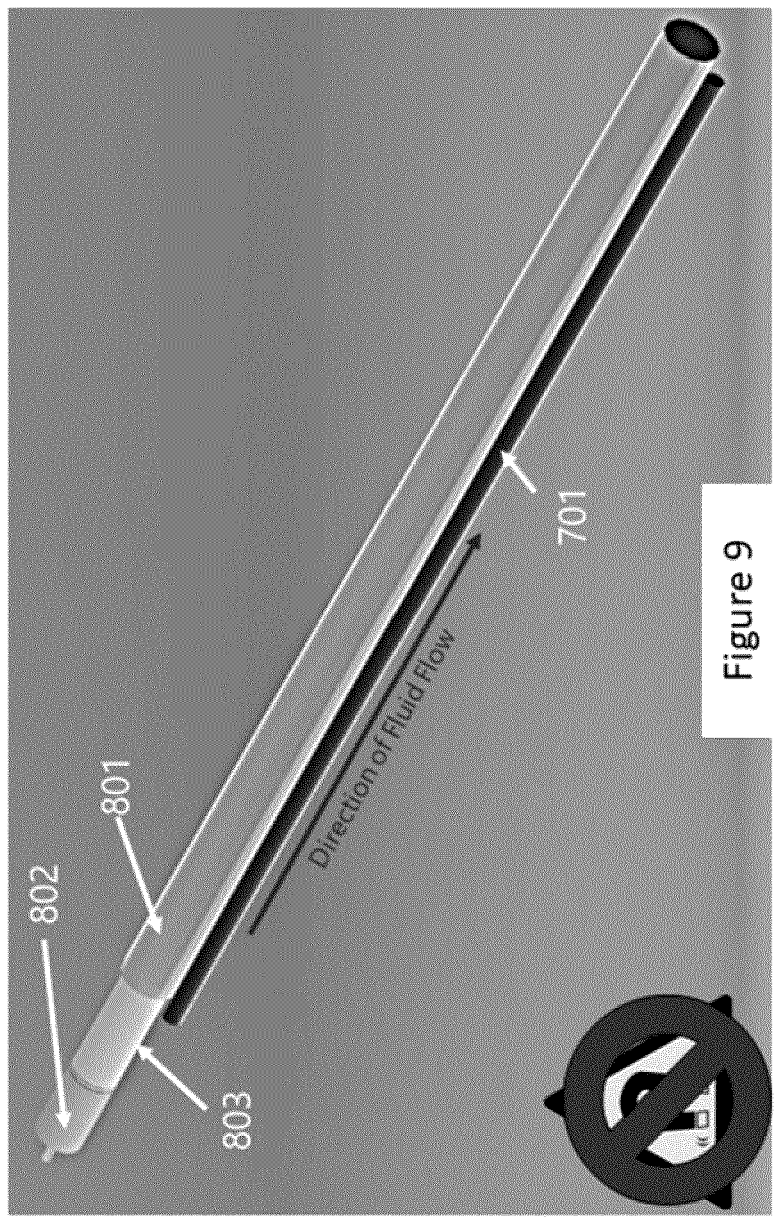
FIG. 9 shows a CAD assembly of the separation tube 701 aligned with the magnet array in the "off" position where the magnetic field shield 801 801 is between the tube 701 and magnet array 704.

FIG. 9 presents the same assembly found in FIG. 8, but instead with the magnet in the "off" position. The separation tube 701 still runs along the permanent magnet array 704. However, in the off position, the magnet array 704 and magnetic field shield 801 is rotated using the rotation servo 802 and gear train 803 such that the magnetic field shield 801 is between the separation tube 701 and the permanent magnet 704. As described with FIGS. 4 and 5, the HMPSM material used for the magnetic field shield 801 prevents the magnetic flux from passing through it. Because of this, the magnetic flux gradient that the separation tube 701 is exposed to is significantly reduced, thereby losing the hold of the magnetic field on the magnetic beads. The application of a high flow rate of liquid or gas to the separation tube 701 can be used to flush out the magnetic beads and magnetically bound cells.

FIG. 10 is a cross-section of the interface between the separation tube 701, the magnetic field shield 801, and the permanent magnet array 704. When in the "on" position, as presented in FIG. 10A, there exists a significant magnetic field acting on separation tube 701 that can attract magnetic particles. When in the "off" position, as presented in FIG. 10B, the magnetic field acting on the separation tube 701 is negligible, and previously bound cells and beads can be effectively removed.

FIG. 11 is a side view of the interfacing of the cassette 1101 and the automated cell culture instrument 1102. The separation tube 701 is attached to the cassette 1101, allowing for either the magnetic or non-magnetic fraction to be moved from and towards different regions within the cassette 1101. Conversely, the magnetic separation assembly (consisting of 704 and 801 together) is contained within the automated cell culture instrument 1102. Control systems associated with the instrument 1102 can control the servo 802 and gear train 803 to rotate the magnet array 704 and magnetic field shield 801, thereby turning the magnetic field "on" or "off" as it pertains to the separation tube 701. When the cassette 1101 and instrument 1102 are interfaced together, the separation tube 701 and separation assembly (704 and 801 together) are aligned, allowing for effective magnetic separation to be performed. Furthermore, using the peristaltic pump associated with the instrument 1102, fluids (either with or without magnetic beads and cells) can be transported or removed from the separation tubing 701.

FIG. 12 consists of side views of the separation tube 701 situated between the outside wall of the cassette 1101 and the outside wall of the cell culture instrument 1102 with various means of increasing the number of and magnitude of magnetic field gradients within the separation tube 701. FIG. 12A presents a paramagnetic/non-magnetic spacer 1201 that runs the length of the separation tube 701 on the outside face of the cassette 1101. This spacer 1201 acts to compress the tube 701 to minimize the distance between magnetised elements flowing through the tube 701 and the magnet array 704. As well, magnetisation of the spacer 1201 (if paramagnetic) from the magnet array 704 will result in the formation of another magnetic field gradient in the separation tube 701 on the side closest to the cassette 1101. Furthermore, cutting the spacer 1201 into smaller subsections along the length of the spacer 1201 (not shown) can allow for the generation of high gradient magnetic fields at points at the end of each spacer subsection 1201. FIG. 12B presents a paramagnetic wire mesh 1202 within the separation tube 701 that, when exposed to the magnetic field generated by the permanent magnet array 704, generates high magnetic field gradients around the strands of the mesh 1202. FIG. 12C presents paramagnetic particles 1203 situated within the separation tube 701 that generate localised magnetic field gradients when exposed to the magnetic field from the permanent magnet array 704. FIG. 12D presents a paramagnetic rod 1204 that runs along the length of the separation tube 701 and is broken into smaller subsections lengthwise (not shown) and, when exposed to the magnet array 704 are able to generate high magnetic field gradients at the ends of each rod 1204. FIG. 12E shows a series of paramagnetic rods 1205 running the length of the separation tube 701 where high magnetic field gradients are formed between the rods 1205 when they are exposed to a magnetic field from the array 704. FIG. 12F presents a paramagnetic scaffold 1206 running the length of the separation tube 701 where high magnetic field gradients are formed within the pores when exposed to a magnetic field from the array 704. FIG. 12G shows a paramagnetic coating 1207 of the separation tube 701 that consists of small aberrations that generate high magnetic field gradients between them when exposed to a magnetic field from the array 704. FIG. 12H shows a paramagnetic filter 1208 placed within the separation tube 701 that generates high magnetic field gradients within the filter pores when exposed to a magnetic field from the array 704.

Optionally or additionally, in some aspects of the invention various parameters are adjustable such as magnetic field intensity, spatial distribution (concentration) of biomolecule targets and/or other parameters such as temperature. For example, the flow rate and/or viscosity and/or elasticity of the biological sample fluid may be adjusted such as to allow separation of target cells yet preventing, at least substantially, coagulation of non-target cells. In some embodiments, a fluid may be used to wash out the separated target cells. The flow regime and rate of the washing fluid is optionally adjusted to promote dislodging (i.e. promote the removal or release) the target cells from the tube wall, such abruptly altering the flow thereby inducing turbulences or shocks that help eroding or destabilize the target cells on the tube wall.

In certain embodiments, release of separated cells off of the separation tube by a variety of methods and combinations of methods (e.g. degaussing, bubbling, vibrations, enzymes, sonic and combinations thereof) may be carried out prior to and/or concurrent with washing the cells out of the tube. This peripheral processing may be done to improve separation and the characteristics of the desired target population with respect to quality and/or quality. For example, using a Red Blood Cell (RBC) lysis may help to remove sticky RBCs, improve purity and therefore make it easier to separate the T cells from the general PBMC population.

Enzymes as noted such as DNase may be used to help with cell release.

Furthermore, when high quality or purity depletion is intended (rather than collection of the target cells), sufficiently strong magnetic fields may be applied that is stronger than used for collection, at the expense of non-target cells adhering to the wall and/or coagulating.

The devices, systems and methods may be embodied in a kit, as well as its use, for practicing one or more methods of the invention comprising one or more reagents, one or more magnetic particle, one or more binding partner, magnet array, magnetic field shield, and/or instructions for use.

Without further description, it is believed that one of ordinary skill in the art can, using the preceding description and the following illustrative examples, make and utilize the present invention and practice the claimed methods. The following working examples therefore, specifically point out typical aspects of the present invention, and are not to be construed as limiting in any way the remainder of the disclosure. Thus, the examples are for illustrative purposes only and should not be used to limit the scope of the present invention in any manner.

EXAMPLES

Example 1—Separation of Beads from Fluid

T cells (derived from PBMCs from Lonza) that were activated and expanded using CD3/CD28 Activation Dynabeads® (by Invitrogen) were processed using the magnetic separation system (704 and 801) with the goal of separating the T cells from the beads. 31 ml of the bead-cell ($1.6 \times 10^6$ cells/ml) fluid suspension (T cell medium, 94% X-Vivo 15, 5% HS, 1% P/S, 10 ng/ml IL-2) was loaded through the separation tube 701 at different flow rates (5, 10, and 20 ml/min) with the magnetic separation assembly (704 and 801) set to the "on" position. The fluid collected from the separation tube was termed the "cell fraction", as cells (not magnetically bound) were unlikely to be removed from the fluid suspension. The magnet assembly (704 and 801) was manually rotated (without the use of 802 and 803) to the "off" position, such that the paramagnetic material 801 was between the separation tube 701 and the magnet array 704. Three flushing cycles (consisting of alternating air and fluid rinses at 40 ml/min for 4 ml each) in the separation tube 701 were performed to rinse off and collect the Dynabeads® and any cells attached to the tubing 701 wall. This was termed the "magnetic fraction" as it consisted of all magnetically attracted cells and beads.

Figures 13A, 13B:
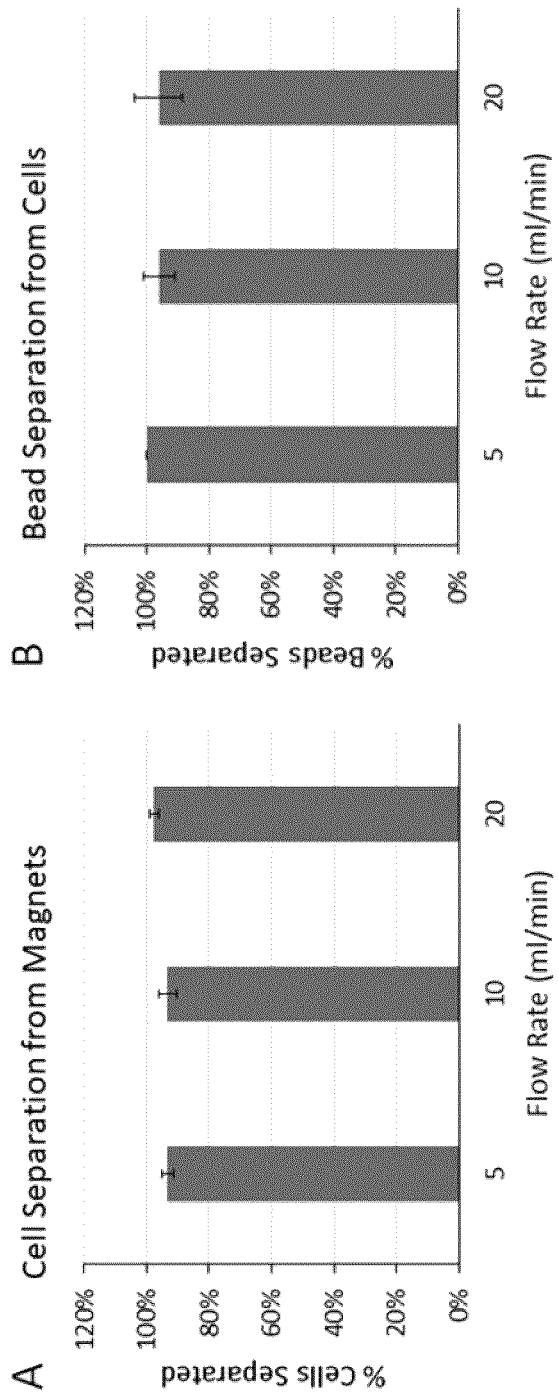
FIG. 13 shows results obtained from working example 1 demonstrating successful separation of cells from magnetic beads at different flow rates.

Using cell counts from both fractions, the percentage of cells successfully separated from the Dynabeads® (i.e. percentage of the total cells obtained in the "cell fraction") was calculated. At all applied flow rates, the percentage of cells that were successfully separated from the Dynabeads® were approximately 95% (FIG. 13A). Both fluid fractions were also counted using a hemocytometer to measure the number of Dynabeads® in each respective fraction. At all flow rates, the percentage of Dynabeads® removed from the cells was at least 95% (FIG. 13B).

Example 2—Continuous Flow of Bead Bound Cells Through Separation Tube

Streptavidin nanobeads (from BioLegend®) were bound to passaged Jurkats outside of the cassette 1101 for positive selection using the magnetic separation assembly (704 and 801). The cells ($10^7$ cells/ml) were first blocked for non-specific binding adding a blocking agent (5 μl/$10^7$ cells, Human TruStain FcX™, Biolegend®) that binds to Fc receptors on cells by incubating the cells and agent together for 10 minutes at room temperature. A biotin conjugated primary antibody cocktail (10 μl/$10^7$ cells, Human CD14+ Monocyte Isolation, Biolegend®) that binds to the cells of interest was added and the mixture was incubated at 2-8° C. for 15 minutes. The streptavidin coated Nanobeads (10 μl/$10^7$ cells) were similarly added to the cell suspension at 2-8° C. for an additional 15 minutes. The streptavidin on the Nanobeads binds to the biotin on the antibody of the cell of interest, thereby magnetically binding the cell. To ensure a pure population of magnetically bound cells, the bound cells were pre-sorted by loading into an EasySep™ (by STEMCELL Technologies®) magnet for 5 minutes, and then the unbound cell filled supernatant was poured off.

To separate the Jurkats using the magnet array 704, the Jurkats (1.5-2 ml/min, 3 ml) were passed through the separation tube 701 at different flow rate (1-5 ml/min) while the magnetic separation assembly (704 and 801). Magnetically attracted cells were pulled out of the flow suspension and adhered to the wall of tubing 701 nearest to the magnet array 704. All cells not removed from flow with the magnet turned on were captured as the "negative fraction" (collected at a volume of 9-12 ml). The magnet assembly (704 and 801) was manually rotated to the "off" position, and three flushing cycles (described in example 1) were performed to capture the "positive fraction". All above steps were performed using isolation buffer (98% DPBS, 2% FBS).

Figures 14A, 14B, 14C, 14D:
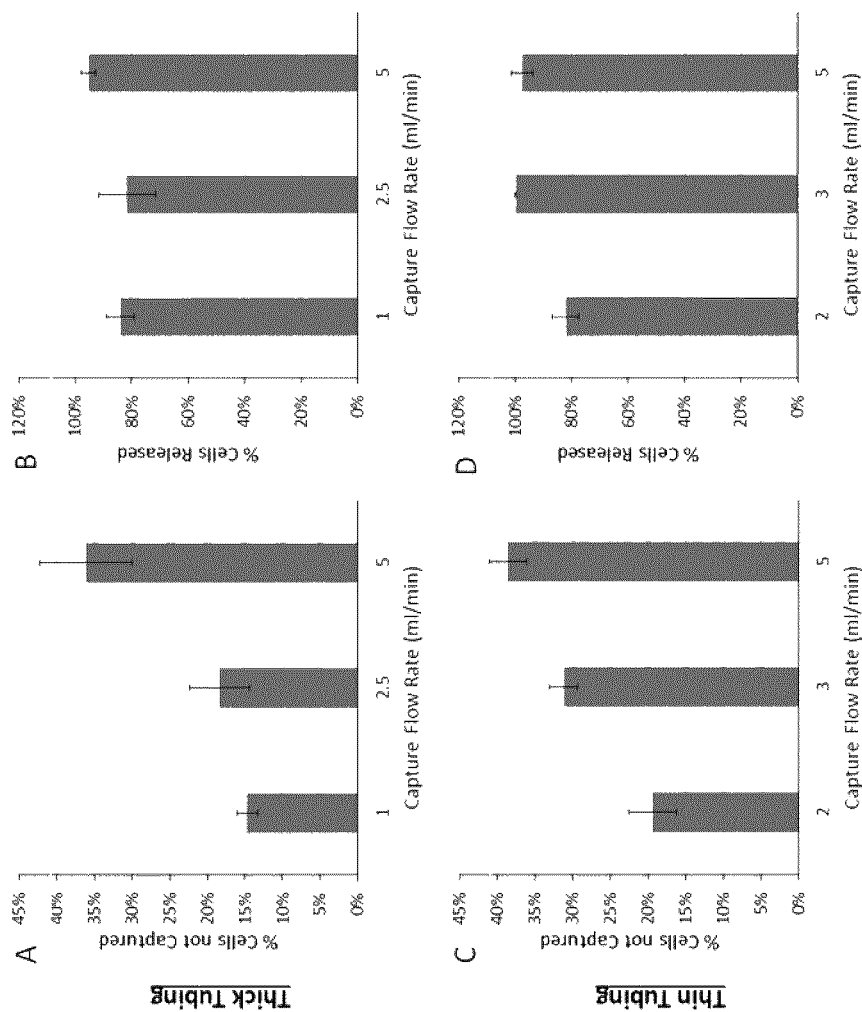
FIG. 14 shows results obtained from working example 2 demonstrating the effect of different flow rates on the capture and release of positively selected cells.

Using cell counts of both the negative and positive fractions, it was possible to determine the percentage of cells that were failed to be captured (all cells in the "negative fraction" compared to the number of cells loaded), as well as the release efficiency of positively captured cells (cells that were captured that were then successfully obtained in the "positive fraction"). Increasing the capture flow rate in the separation tube 701 resulted in increased numbers of cells failed to be captured by the systems (FIGS. 14A and C), which is attributed to the reduced time the bound cells would be exposed to the magnetic field. However, increasing capture flow rates to 5 ml/min greatly improved the release rate of the bound cells up to almost 100% (FIGS. 14B and D). This is likely due to fewer cells leaving suspension at the higher flow rate and becoming trapped at various junctions in the tubing circuit. Modifying the separation tube inner diameter (thick tubing—1/8" ID, thin tubing—3/32" ID) resulted in slightly increased failure to capture (FIGS. 14A and C), but slightly improved cell release (FIGS. 14B and D). These results are likely due to the increased flow velocity and wall shear stress in the thin tube.

Example 3—Multiple Passes of Bead Bound Cells Through the Separation Tube

Jurkats were magnetically bound and pre-selected for as described in example 2. Similar to example 2, the Jurkats ($2\times10^6$ cells/ml, 3 ml) were passed through the separation tube 701 in isolation buffer at a flow rate of 5 ml/min while the magnetic separation assembly (704 and 801) was turned on. The cells that were not captured by the magnet array 704 were collected as the negative fraction of the first pass (collection volume of 12 ml) in isolation buffer. The cells were again loaded into the separation tube 701 at a capture flow rate of 5 ml/min, and the cells that were still not captured were collected as the negative fraction (again collected as 12 ml) of the second pass. After the second pass, the separation assembly (704 and 801) was turned to the "off" position, and the captured cells in the separation tube 701 were exposed to 3 flushing cycles (described in example 1) to acquire the positive fraction. All above steps were performed with isolation buffer.

Figures 15A, 15B:
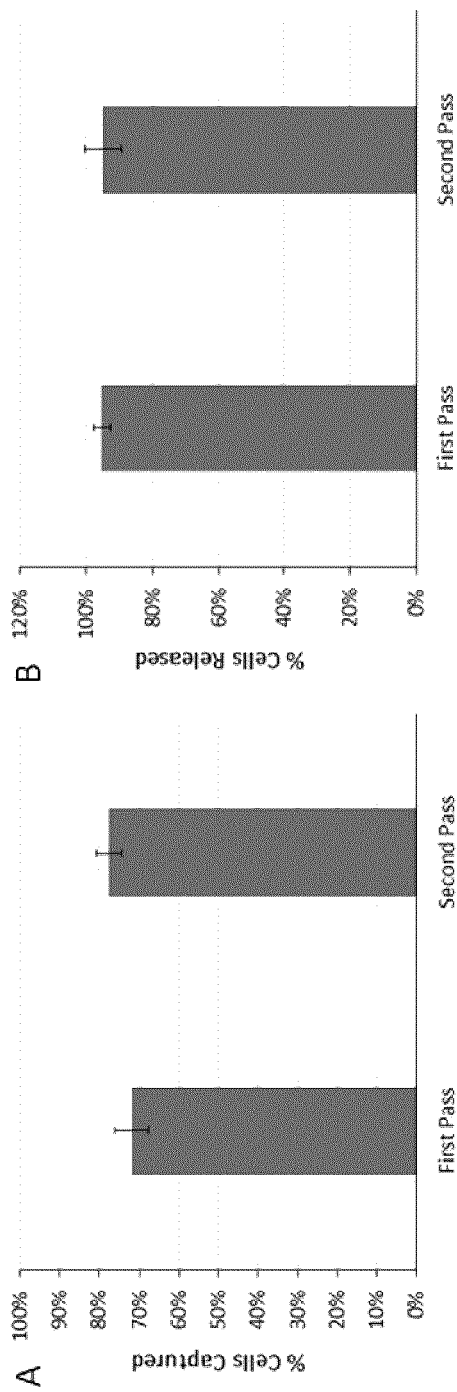
FIG. 15 shows results from working example 3 of adding multiple passes to the magnetic separation process through the separation tube 701 in terms of the capture and release of positively selected cells.

As with example 2, the cells from each fraction were counted and quantified in terms of failure to capture (for both passes as a percentage of the total cells loaded into tube 701), and release efficiency. Adding an additional pass of the cells past the separation tube 701 did successfully reduce the percentage of cells that were failed to be captured (FIG. 15A) and didn't result in any negative reduction in release (FIG. 15B) compared to a single pass.

Example 4—"Wait Time" in Separation Tube

Jurkats were magnetically bound and pre-selected as described in example 2. To effectively increase the duration in which the bound cells were exposed to the magnetic field, after being loaded into the separation tube 701, the Jurkats ($1.5\times10^6$, 3 ml) were kept static for different durations of time (1-5 minutes) with the magnetic assembly (704 and 801) turned to the "on" position. The tube 701 was gently rinsed for 12 ml at 5 ml/min, and the outflow was collected as the negative fraction. After the wait duration, the separation assembly (704 and 801) was turned to the "off" position, and three flushing cycles (described in example 1) were applied to collect the positive fraction. The above steps were all performed using isolation buffer.

Figures 16A, 16B:
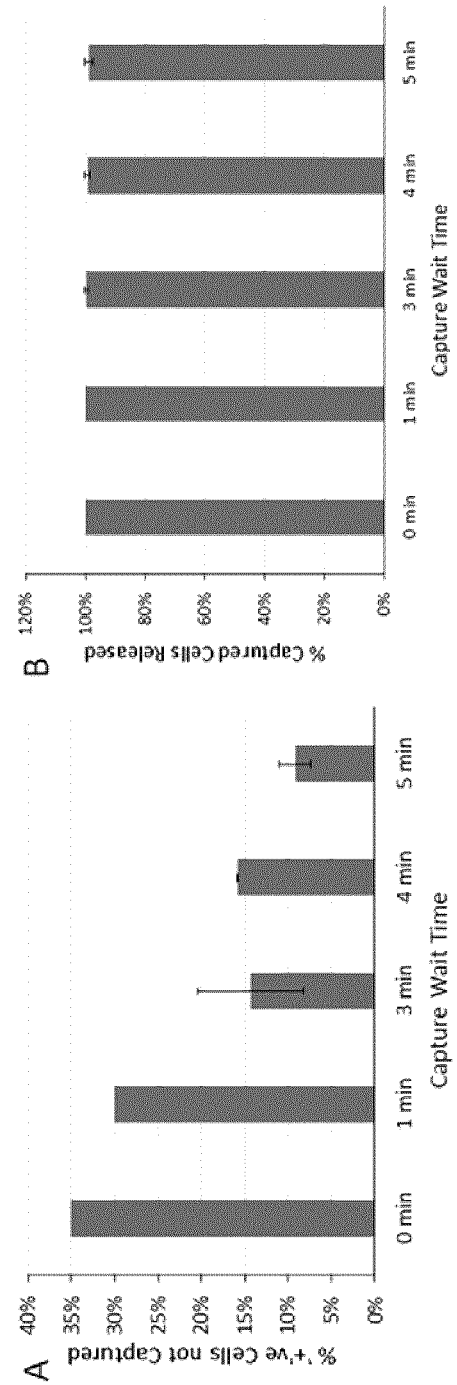
FIG. 16 shows results from working example 4 of increasing the magnetic bead exposure to the magnetic field through the addition of a wait time in terms of capture and release of positively selected cells.

The collected negative and positive fraction were again counted and quantified in terms of failure to capture and release rate. A significant trend of increasing wait time leading to reduced failure to capture was observed (FIG. 16A), which is likely due to the additional time that the magnetic particles can respond to the magnetic field. Additionally, despite the increased wait time, the release rate for each wait duration was close to 100% (FIG. 16B), suggesting that the improved capture rates are not simply due to increased cell loss in junctions in the tubing circuit.

Figure 17:
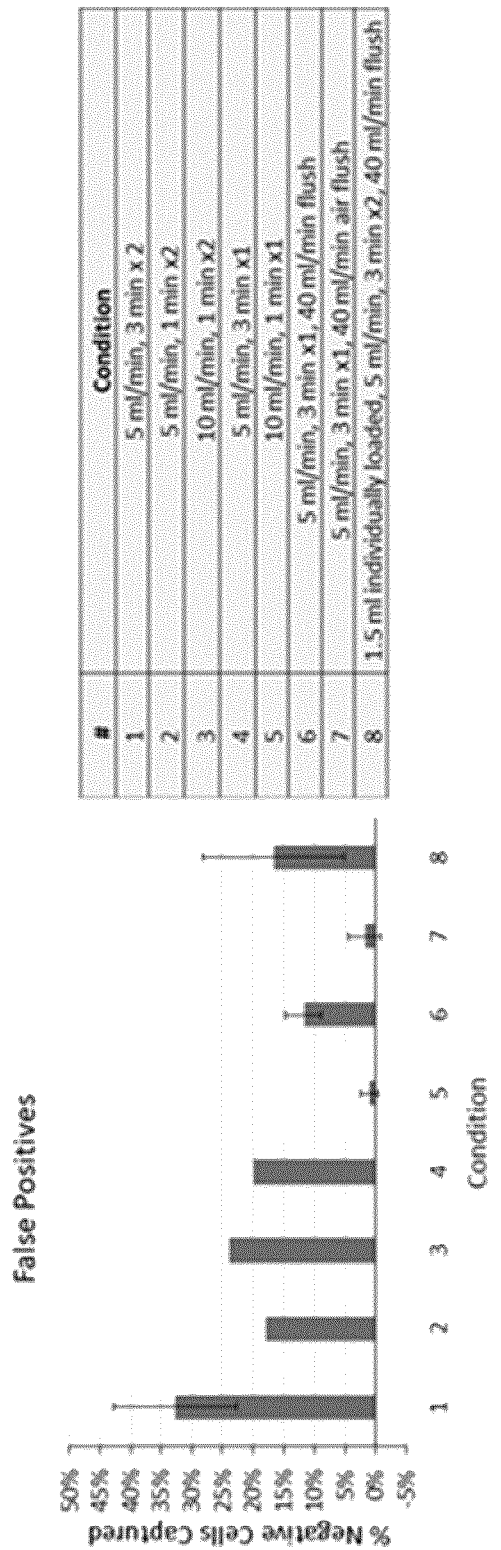
FIG. 17 shows how various process modifications can modify the percentage of false positives obtained from working example 4.

With the addition of a wait duration to the process, it is more likely for negative cells to be captured by the process (hereafter referred to as "false positives"). To quantify the percentage of false positives, Jurkats that did not undergo binding with magnetic beads were loaded ($3\times10^6$ cells/ml, 3 ml) into the separation tube 701 at different capture flow rates (5 ml/min or 10 ml/min). As well, the cells waited for different durations of time (1 min or 3 min), and exposed to different "negative fraction" flushes, consisting of high flow rate air or fluid slushes, with the magnetic assembly (704 and 801) still in the "on" position. Since the cells that were loaded were unbound, all cells were expected to come out in the "negative fraction", and any that didn't were deemed to be "false positives". Although using a more conventional capture sequence (5 ml/min capture flow rate, 3 min wait time) resulted in a poor rate of false positives (30%), both increasing the capture flow rate and reducing the wait time reduced this to about 20% (FIG. 17). Furthermore, the incorporation of both a significant reduction in wait time and increase in capture flow rate (condition 5) and addition of a 40 ml/min air flush (condition 7) could reduce the false positive rate to <3% (FIG. 17).

Example 5—Separation and Purification of Mixed Population of Cells

Thawed human peripheral blood mononuclear cells (PBMC) were bound with Dynabeads® for selecting CD3+ cells from a heterogenous cell population by positive selection (from ThermoFisher Scientific). The PBMCs ($10^7$ cells/ml) were first incubated with CD3 antibody (5 µl/$10^7$ cells, FlowComp™ Human CD3 Antibody, Invitrogen) at 2-8° C. for 10 minutes. The PBMCs were then bound with Flow-Comp™ Dynabeads (15 µl/$10^7$ cells, Invitrogen) for 15 minutes under rocking and tilting at room temperature. The bead bound cells ($5\text{-}10\times10^6$ cells/ml, 1.5 ml) were loaded through the separation tube 701 past a magnet array 704 using different process parameters (flow rate, wait times, number of passes, described in FIG. 18). All cells not captured by the magnet (CD3 negative cells) were sent to waste and not characterized. The magnet array 704 was turned to the "off" position and the tube 701 underwent three flushing cycles to acquire the "positive fraction", which would consist of bead bound CD3+ cells. All steps above were performed in isolation buffer supplemented with 2 mM EDTA.

Figures 18A, 18B, 18C, 18D, 18E, 18F, 18G, 18H:
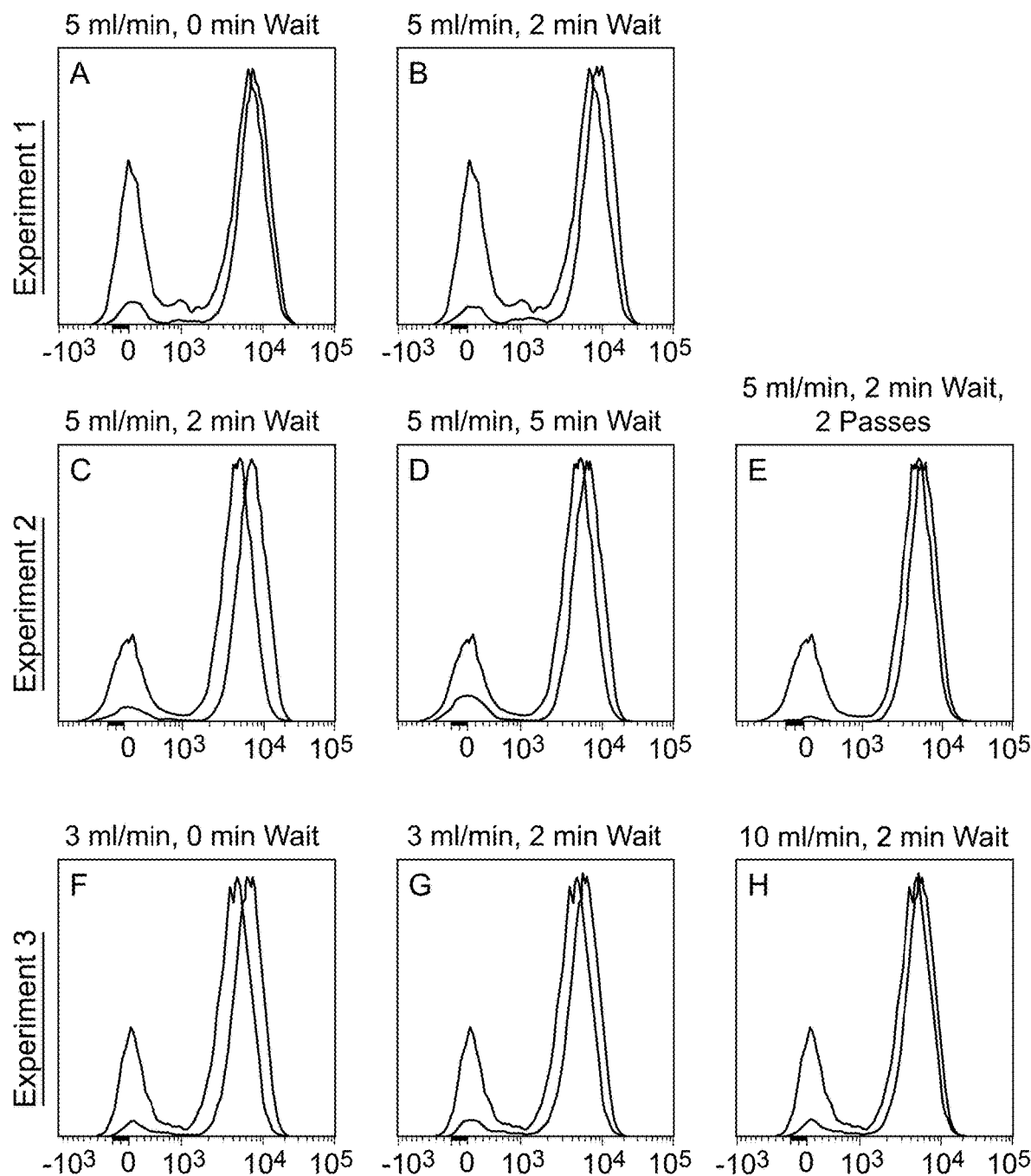
FIG. 18 shows results obtained from working example 5 of the purification of mixed cell populations flown through the separation tube 701 past a magnet array 704.

The pre- and post-separation fractions (300k cells for each well) were fluorescently stained for viability (0.031 µl/100 µl, Live/Dead™ Green, Invitrogen), CD3 (5 µl/100 µl, PE mouse anti-human CD3, BD Biosciences) and, in some experiments, CD14 (0.625 µl/100 µl, CD14 Monoclonal Antibody—Pacific Blue, Invitrogen), and were analysed using flow assisted cell sorting (FACS) to assess the phenotype of the obtained fractions. The initial loaded population was found to be heterogenous, but primarily CD3+(FIG. 18—Black lines). For comparison, various process parameters were tested using the magnet array 704. It was observed that modifying the wait time from 0 to 2 min with Dynabead® bound cells had a limited effect on the purity of the output cells (FIG. 18A, B and FIG. 18F, G). However, increasing the wait time further to 5 min significantly reduced the purity of the cells (FIG. 18C, D). Flow rate also had a limited effect on cell purity between 3 ml/min and 10 ml/min (FIG. 18G, H). The most substantial improvement on cell purity came by adding a second pass to the process, which improved purity to 97.5% CD3+ cells (FIG. 18E).

Example 6—Different Sized Magnets for Capturing Magnetic Beads

Figures 19A, 19B, 19C:
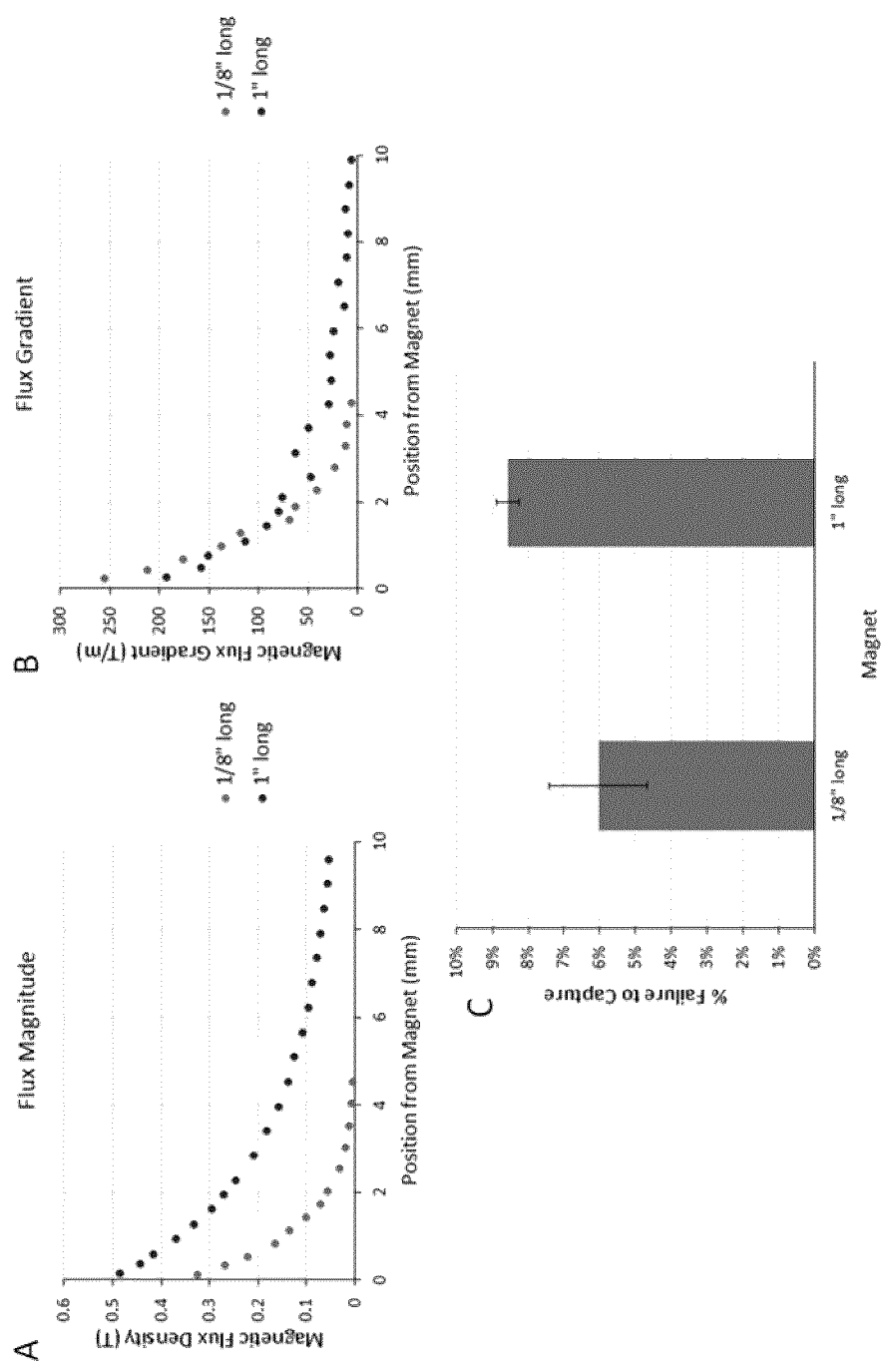
FIG. 19 shows results obtained from working example 6 demonstrating how modifying magnet 702 and 703 sizes can affect magnetic field properties generated by the magnet array 704 and cell capture.

Different sized (⅛" and 1" long) permanent magnets (702 and 703) were used to assemble magnet arrays 704. The magnitude of the magnetic field was measured at different specific distances from the magnet using a Gaussmeter (AlphaLab Inc.) (FIG. 19A). From the magnitude measurements an estimate of the magnetic field gradient was calculated (FIG. 19B). It was determined that to generate the strongest gradient, a smaller length magnet was more desirable. However, this stronger gradient degraded more rapidly than with a longer magnet, thereby reducing the effective range of the magnet. This demonstrated the potential of using different magnet sizes in the magnet array 704 to achieve different separation goals, such as short-range separation of weakly bound targets, and long-range separation of strongly bound targets.

To test the effect of magnet 702 and 703 size on cell separation, Jurkat cells were bound by BioLegend® Nanobeads as described in example 2. The bead bound cells ($2.5 \times 10^6$ cells/ml, 1.5 ml) were flown past the magnet array 704 within the separation tubing 701 at a flow rate of 5 ml/min and with a wait time of 5 min. The unbound cells were flushed out of the tubing 701 with 12 ml of isolation buffer (98% PBS, 2% FBS, 2 mM EDTA) at 5 ml/min. The magnetic field generated by the array 704 was removed from the tubing 701 and three flushing cycles (described in example 1) were performed to remove the positive fraction from the tubing. The results were compared to those obtained from the typical magnet assembly (704 and 801). It was observed that the ⅛" long magnets 702 and 703 reduced failure to capture compared to the 1" long magnets 702 and 703 (FIG. 19C). All preceding steps were performed using isolation buffer.

Example 7—Add-Ons to Promote the Capture of Weakly Bound Biological Targets

Figures 20A, 20B:
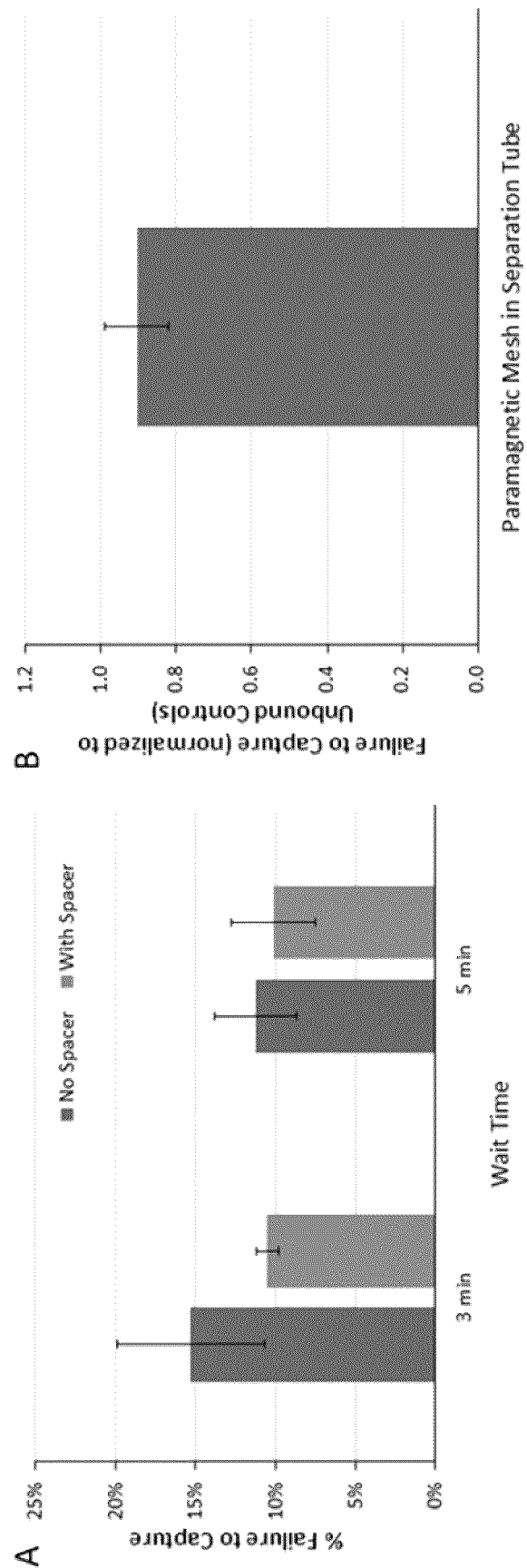
FIG. 20 shows results obtained from working example 7 on the effect of adding a bar/spacer 1201 to the cassette.

One method to alter or improve the ease of capture for weakly bound targets/small beads is reducing the distance between the magnet array 704 and the separation tube 701, thereby increasing the average magnetic field magnitude and gradient experienced within the tube 701 as demonstrated by Example 6. To do this, a 3/32" thick spacer 1201 was placed between the separation tube 701 and cassette 1101. Jurkat cells ($2.5-5 \times 10^6$ cells/ml, 1.5 ml) bound with BioLegend® Nanobeads, as described in example 2, were flown into the separation tube 701 at a flow rate of 5 ml/min and allowed to wait for 3 or 5 minutes. The non-captured cells were then flown out at 5 ml/min (11-13 ml), and three flushing cycles (described in example 1) were performed to collect the captured cell fraction. Results obtained with a spacer 1201 added to the setup demonstrated an improvement in terms of failure to capture using the spacer and a 3-minute wait time to levels obtained with a 5-minute wait time (FIG. 20A). The preceding steps were performed using isolation buffer.

Another method to reduce the distance between the biological targets and the magnetic field is to include magnetisable objects (1202-1208) within the separation tube 701. The magnetic field produced by the magnet array 704 can be amplified by these objects (1202-1208), producing a magnetic field gradient inversely proportional to the size of the object (1202-1208), and with an effective range proportional to the size of the object (1202-1208). To demonstrate this, a paramagnetic mesh 1202 was added to the separation tube 701. Jurkat cells ($1.25 \times 10^7$ cells/ml) were bound with MACS® MicroBeads (20 μl/$10^7$ cells, CD3 Microbeads—Human, Miltenyi Biotec) by incubating the cells and pre-conjugated beads together for 15 minutes at 4-8° C. After binding, the cells were flown into the separation tube 701 containing the paramagnetic mesh 1202 ($9 \times 10^6$ cells/ml, 1.5 ml) at 5 ml/min and were allowed to wait for 5 minutes. The uncaptured cells were flushed from the tube 701 at 5 ml/min with 12 ml of isolation buffer. The magnet array 704 was turned to the off position, and three flushing cycles (described in example 1) were applied to remove the positively captured cells from the tube 701. To account for non-specific capture by the mesh 1202, the result was normalised to those obtained from bead-free controls (Jurkats not bound by the MicroBeads), where all capture would be due to physical arrest from the mesh 1202. Using a paramagnetic mesh resulted in a relative increase in cells captured of 10% with the beads compared to without the beads (FIG. 20B). The preceding steps were performed using isolation buffer supplemented with 2 mM EDTA.

Methods Utilizing Recirculation and Magnetic Fields

As described herein, in exemplary embodiments, the methods for magnetic separation of targets within a biological sample suitably utilize recirculation of a sample through multiple (i.e., 2, 3, 4, 5, 6, 7, 8, 9, 10, etc.) cycles of magnetic separation. Through such recirculation, the yield of a desired target is dramatically increased.

Figure 21:
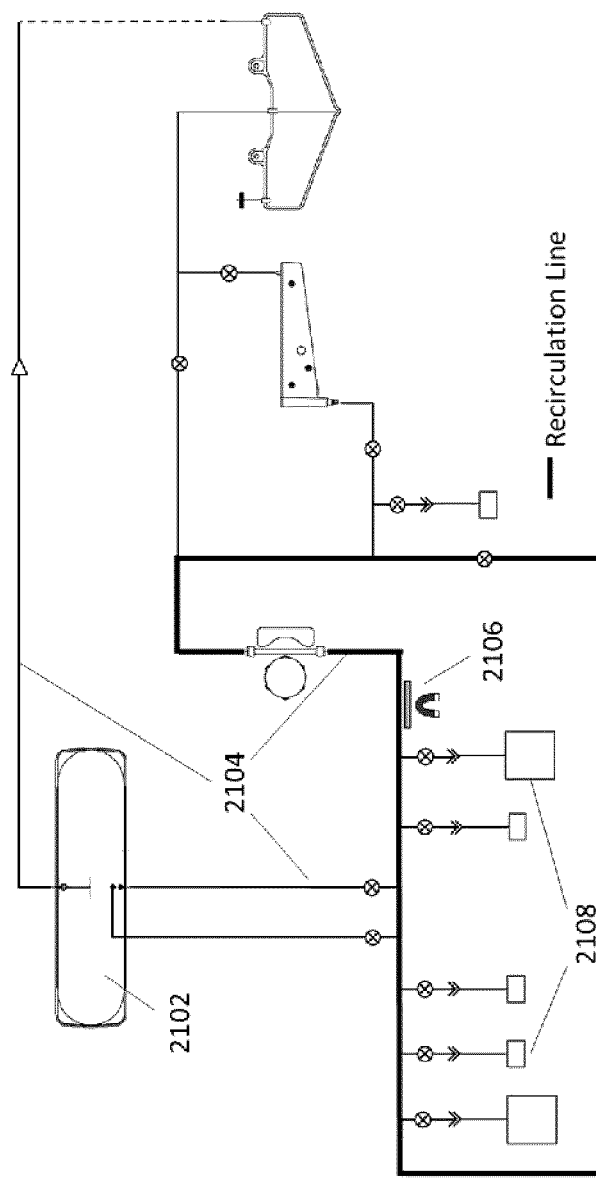
FIG. 21 shows a schematic of a recirculating magnetic separation methods in accordance with embodiments hereof.
Figures 22A, 22B, 22C, 22D:
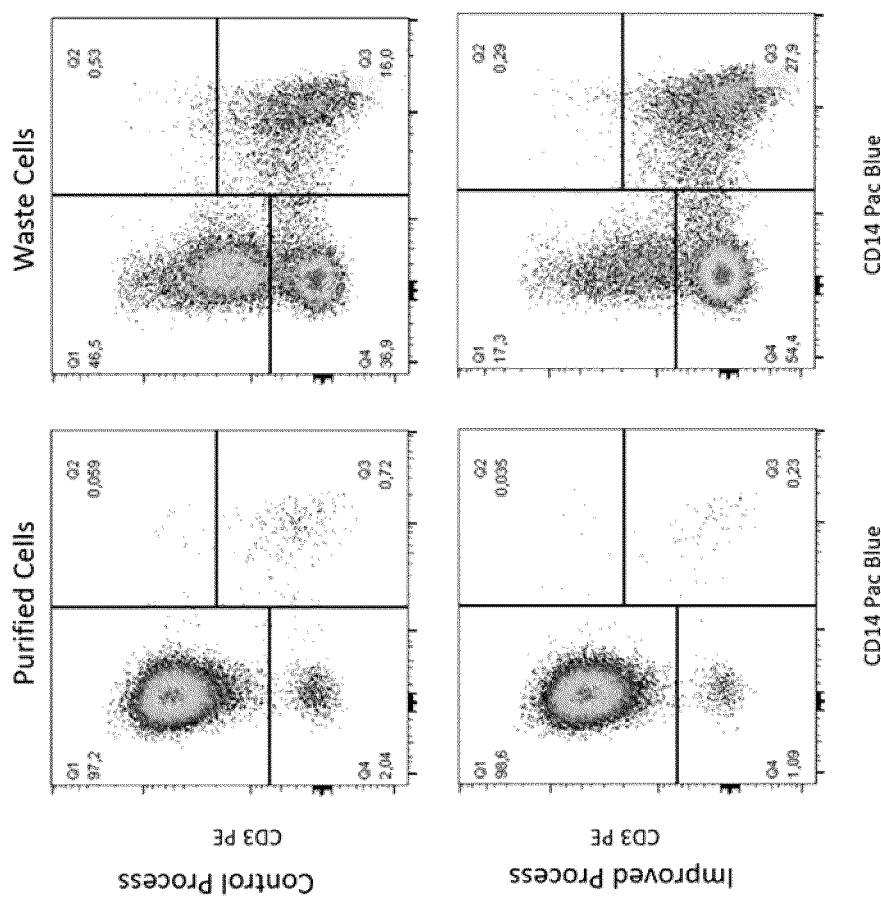
FIG. 22A-22D show the recovery of purified and waste cells in accordance with embodiments hereof.

The methods described herein are suitably carried out in an automated cell culture system, and in embodiments can take place in a cassette within the automated cell culture systems. FIG. 6 shows an exemplary cassette, and FIG. 21 shows the placement of this cassette in the flow diagram of an automated cell culture system. As shown in FIG. 21, the automated cell culture system suitably includes a cell proliferation chamber 2102 and several fluidics pathways 2104 as well as a magnetic field source 2106, as well an input locations for reagents 2108.

FIG. 21 shows an exemplary embodiment in which a recirculation path/line is illustrated, where a biological sample containing a target biological population is circulated multiple times through the recirculation path/line (bold line). Suitably, during each pass, the sample is exposed to a magnetic field gradient by magnetic field source 2106 (e.g., a permanent or electromagnet).

The methods described herein that utilize recirculation of the biological sample to remove a target biological population can rely on positive or negative selections methods, or combinations of both.

Positive Selection Methods

In embodiments that utilize positive selection methods for isolating and capturing the target biological population, provided herein are methods for collecting a target biological population from a biological sample in an automated cell culture system, the method comprising: binding the target biological population to magnetic particles; circulating the biological sample through one or more fluidics pathways of the automated cell culture system; exposing the target biological population bound to the magnetic particles to a magnetic field gradient; repeating the circulating and exposing steps one or more times; and collecting the target biological population bound to the magnetic particles. In additional embodiments, the methods can further include removing the target biological population from the bound magnetic particles.

Such positive selection methods rely on direct removal of the target biological population from a biological sample, utilizing a magnetic field to positively select the desired target population from the sample.

As described herein, suitably the target biological population is bound to a magnetic particle. Methods for binding the magnetic particles to the target biological population are described herein and suitably use an antibody, a protein or a nucleic acid. As described herein, the target biological population suitably includes one or more cells, viruses, bacteria, proteins, DNA and/or RNA. In exemplary embodiments, the target biological population is a population of T cells, suitably T cells that have been produced to include a desired receptor. The biological sample from which the target population is removed can also include other cells, viruses, bacteria, proteins, DNA, RNA, etc., that are undesired (i.e., a non-target population).

Additional steps that can be included in the positive selection methods described herein include washing of the biological sample (e.g., a cell population), washing of the magnetic particles, transferring of target biological population to a cell culture zone (e.g., a proliferation chamber), and transfer of a non-target biological population to a waste chamber, and ultimate removal from the automated cell culture system.

The biological sample is circulated through one or more fluidics pathways of the automated cell culture system, for example as illustrated in FIG. 21. In embodiments, the biological sample can begin as a cell culture sample in an input location point 2108 of the system, or in embodiments, in the cell proliferation chamber 2102, after which it is transferred to an area where magnetic particles containing an antibody or other agent are provided, such that the magnetic particles bind to the desired, target population (e.g., cells). This binding to the magnetic particles can also occur within the proliferation chamber 2102 or any input location 2108 or chamber within the system.

The biological sample is then passed through the section of the automated cell culture system that includes the source of the magnetic field 2106, such that the target biological population bound to the magnetic particles is exposed to a magnetic field gradient. As a result of this exposure, the target biological population (e.g., a population of desired cells) becomes bound to the source of the magnetic field (e.g., collects against the side of a separation tube 701 or other similar device), that is adjacent the magnetic field source that produces the magnetic field. This separation pulls the target biological population (or at least a portion of the target biological population) out of the sample. The target biological population that is bound to the magnetic particles is then suitably collected. Exemplary methods of collecting the target biological population include removing and washing the target biological population after exposure to the magnetic field. In embodiments, the target biological population is collected by circulating a gas phase fluid followed by a liquid phase fluid one or more times, through the system. Suitably, the gas phase fluid comprises one or more of air, nitrogen, oxygen and carbon dioxide. In further embodiments, the liquid phase comprises one or more of water, buffered saline solution, culture medium, animal serum, chelating agents and enzymes.

As described herein, it has been determined that recirculation of a sample through multiple (i.e., 2, 3, 4, 5, 6, 7, 8, 9, 10, etc.) cycles of magnetic separation increases the amount of target population that is removed from a sample. Thus, in suitable embodiments, the steps of the positive selection method in which the biological sample is circulated through one or more fluidics pathways of the automated cell culture system and the target biological population bound to the magnetic particles is exposed to a magnetic field gradient, are suitably repeated two or more (e.g., 2, 3, 4, 5, 6, 7, 8, 9, 10, etc., or more) times. As shown in FIG. 21, this recirculation suitably occurs through the recirculation cycle, where the sample is passed adjacent the source of the magnetic field 2106 to bind the target population, and then the sample is re-circulated and again passed adjacent the source of the magnetic field to remove even more of the target population that may not have been captured in prior passes, prior to ultimately collecting the final target sample. This cycle can be repeated as many times as desired until either a goal is reached of the target population, or it is determined either statistically or via other means that additional cycles will not dramatically increase the yield and/or purity of the target population. Following the collection of the target biological population, the methods suitably include removing the target biological population from the bound magnetic particles, so that the target population can be further processed or utilized in various procedures etc., as described herein.

In additional embodiments, the recirculation methods described herein can include a rinsing of a target population that is bound to the magnetic source (e.g., a separation tube used in the magnetic-based methods), followed by transferring the washed target population to the proliferation chamber for further processing and/or expansion. These elements of capture, rising and transferring can then be carried out with another biological sample that includes a magnetically-bound target population.

In embodiments, the magnetic field gradient to which the target population is exposed is provided by one or more permanent magnets. Exemplary materials that can be utilized in permanent magnets are described herein and suitably include magnetite, neodymium, samarium-cobalt and/or Alnico. As described herein, in embodiments, the permanent magnet is suitably configured in a linear array, such as the magnet array 704 in FIG. 7B.

In additional embodiments, the magnetic field gradient is provided by one or more electromagnets, as described herein.

In further embodiments, a positive selection method is provided herein that includes collecting a target biological population from a biological sample in an automated cell culture system, the method comprising binding the target biological population to magnetic particles, circulating the biological sample through one or more fluidics pathways of the automated cell culture system, exposing the target biological population bound to the magnetic particles to a magnetic field gradient to capture the target biological population bound to the magnetic particles, circulating unbound components of the biological sample through one or more fluidics pathways of the automated cell culture system, inserting a magnetic field shield/barrier between the target biological population bound to the magnetic particles and the magnetic field to release the target biological population bound to the magnetic particles, circulating the target biological population bound to the magnetic particles through one or more fluidics pathways of the automated cell culture system, repeating the circulating the biological sample through circulating the target biological population steps one or more times; and collecting the target biological population bound to the magnetic particles. In additional embodiments, the positive selection methods can further include removing the target biological population from the bound magnetic particles.

As described herein, such positive selection methods utilize a design in which a biological sample is passed, for example, through a separation tube 701 (such as shown in FIG. 7A). Within the biological sample, a target biological population is bound to magnetic particles. The method suitably includes circulating the biological sample through one or more fluidics pathways prior to or including the separation tube 701 and the magnetic source. The target biological population bound to the magnetic particles is suitably exposed to a magnetic field gradient to capture the target biological population bound to the magnetic particles (and is suitably recirculated through this magnetic field one or more times). For example, as illustrated in FIG. 8, the biological sample passes through the separation tube 701, and the target sample with the bound magnetic particles is captured against the side of tube by the magnetic field (see also FIG. 24D-24E).

Un-bound components in the biological sample (i.e., undesired cells, proteins, DNA, or other structures) are then circulated through one or more fluidics pathways to remove them from the separation tube 701.

A magnetic field shield/barrier is then suitably inserted between the target biological population bound to the magnetic particles and the magnetic field to release the target biological population bound to the magnetic particles from the magnet. The target biological population bound to the magnetic particles is then circulated through one or more fluidics pathways of the automated cell culture system and collected, for example, in a separate area of the automated cell engineering system. Various methods for collecting the target biological population are described herein.

Suitably, the steps of circulating the biological sample, exposing the sample (and the target biological population bound to the magnetic particles), inserting the magnetic shield/barrier between the target population and the magnetic field, and the collection of the target biological population, are repeated one or more times (suitably 2 or more, 3 or more, 4 or more, 5 or more, etc., times). Each time through this cycling increases the yield of the target biological preparation. As described herein, the target biological population is then suitably removed from the bound magnetic particles.

As described herein, suitably the target biological population comprises one or more of cells, viruses, bacteria, proteins, DNA and/or RNA, and in embodiments comprises T cells. Methods and compounds for binding the magnetic particles to a target biological population are described herein and suitably include the use of an antibody, a protein or a nucleic acid.

Exemplary magnetic fields are described herein, and suitably are generated by permanent magnets or electromagnets. Materials for use in preparing permanent magnets are described herein and include, for example, magnetite, neodymium, samarium-cobalt and/or Alnico. In embodiments, the permanent magnet is configured in a linear array. In embodiments in which an electromagnet is utilized, the insertion of the magnetic field shield/barrier can be replaced by turning off the electromagnet, for example by simply removing an electric current from the electromagnet to stop the magnetic field.

As described throughout, in embodiments, the magnetic field shield/barrier suitably comprises high magnetic permeability and saturation materials. As described herein, in embodiments, the magnetic field shield/barrier rotates to insert the magnetic field shield/barrier between the target biological population bound to the magnetic particles and the magnetic field. Such an embodiment is illustrated in FIGS. 8, 9 and 10A-10B, and described herein in detail.

Negative Selection Methods

In embodiments that utilize negative selection methods for the target biological population, provided herein are methods for collecting a target biological population from a biological sample in an automated cell culture system, the method comprising binding a non-target biological population to magnetic particles; circulating the biological sample through one or more fluidics pathways of the automated cell culture system; exposing the non-target biological population bound to the magnetic particles to a magnetic field gradient; repeating the circulating through exposing steps one or more times; and collecting the target biological population. The methods can also further include collecting the non-target biological population, suitably for elimination as waste.

As used herein, methods of negative selection utilize binding magnetic particles to a "non-target biological sample," which refers to one or more cells, proteins, DNA, RNA, etc., that are not included in the "target biological population" and thus are sought to be removed from the biological sample, leaving behind the target biological population. In such negative selection methods, magnetic separation is used to separate out the non-target biological population, allowing for collection of the remaining target biological population from the sample.

As described herein, suitably the non-target biological population is bound to a magnetic particle. Methods for binding the magnetic particles to the non-target biological population are described herein and suitably use an antibody, a protein or a nucleic acid. As described herein, the non-target biological population suitably includes one or more cells, viruses, bacteria, proteins, DNA and/or RNA. In exemplary embodiments, the target biological population is a population of T cells, suitably T cells that have been produced to include a desired receptor, while the non-target biological population includes any other cells, proteins, etc., in the sample that are needed to be removed, leaving behind the target population. The biological sample from which the target population is removed can also include other cells, viruses, bacteria, proteins, DNA, RNA, etc., that are undesired.

The biological sample is circulated through one or more fluidics pathways of the automated cell culture system, for example as illustrated in FIG. 21. In embodiments, the biological sample can begin as a cell culture sample in an input location 2108, or the cell proliferation chamber 2102, or at other positions within the system, after which it is transferred to an area where magnetic particles containing an antibody or other agent are provided, such that the magnetic particles bind to the undesired, non-target population (e.g., undesired cells, protein, DNA, etc.). This binding to the magnetic particles can also occur within the proliferation chamber, at an input location 2108, or other chamber within the system.

The biological sample is then passed through the section of the automated cell culture system that includes the source of the magnetic field 2106, such that the non-target biological population bound to the magnetic particles is exposed to a magnetic field gradient (the target biological population is also exposed, but does not react to the magnetic field). As a result of this exposure, the non-target biological population (e.g., a population of undesired cells, proteins, etc.) becomes bound to the source of the magnetic field (e.g., collects against the side of a separation tube 701 or other similar device), that is adjacent the magnetic field. This separation pulls the non-target biological population (or at least a portion of the non-target biological population) out of the sample. The target biological population that is NOT bound to the magnetic particles is then suitably collected. Exemplary methods of collecting the target biological population include filtering, removing and washing the target biological population from the sample after exposure to the magnetic field (and thus removal of the non-target biological population).

In embodiments, the target biological population is collected by circulating a gas phase fluid followed by a liquid phase fluid one or more times, through the system. Suitably, the gas phase fluid comprises one or more of air, nitrogen, oxygen and carbon dioxide. In further embodiments, the liquid phase comprises one or more of water, buffered saline solution, culture medium, animal serum, chelating agents and enzymes.

As described herein, it has been determined that recirculation of a sample through multiple (i.e., 2, 3, 4, 5, 6, 7, 8, 9, 10, etc.) cycles of magnetic separation increases the amount and/or purity of target population that is removed from a sample. Thus, in suitable embodiments, the steps of the negative selection method in which the biological sample is circulated through one or more fluidics pathways of the automated cell culture system, the non-target biological population bound to the magnetic particles is exposed to a magnetic field gradient; and the collection of the target biological population are suitably repeated two or more (e.g., 2, 3, 4, 5, 6, 7, 8, 9, 10, etc., or more) times. As shown in FIG. 21, this recirculation suitably occurs through the recirculation cycle, where the sample is passed adjacent the source of the magnetic field 2106 to bind the non-target population, the target population is collected, and then the sample is re-circulated and again passed adjacent the source of the magnetic field to remove even more of the non-target population that may not have been captured in prior passes. This cycle can be repeated as many times as desired until either a goal is reached of the target population, or it is determined either statistically or via other means that additional cycles will not dramatically increase the yield and/or purity of the target population. Following the collection of the target biological population, the methods suitably include further processing, filtering or utilization of the target biological population in various procedures etc., as described herein.

In embodiments, the magnetic field gradient to which the non-target population is exposed is provided by one or more permanent magnets. Exemplary materials that can be utilized in permanent magnets are described herein and suitably include magnetite, neodymium, samarium-cobalt and/ or Alnico. As described herein, in embodiments, the permanent magnet is suitably configured in a linear array, such as the magnet array 704 in FIG. 7B.

In additional embodiments, the magnetic field gradient is provided by one or more electromagnets, as described herein.

In further embodiments, a negative selection method is provided herein that includes collecting a target biological population from a biological sample in an automated cell culture system, the method comprising binding a non-target biological population to magnetic particles; circulating the biological sample through one or more fluidics pathways of the automated cell culture system; exposing the non-target biological population bound to the magnetic particles to a magnetic field gradient to capture the non-target biological population bound to the magnetic particles; circulating the target biological population of the biological sample through one or more fluidics pathways of the automated cell culture system; inserting a magnetic field shield/barrier between the non-target biological population bound to the magnetic particles and the magnetic field to release the non-target biological population bound to the magnetic particles; circulating the non-target biological population bound to the magnetic particles through one or more fluidics pathways of the automated cell culture system; repeating the circulating of the biological sample through collecting of the target biological population steps one or more times; and collecting the target biological population As described herein, such negative selection methods utilize a design in which a collecting the target biological population; biological sample is passed, for example, through a separation tube 701 (such as shown in FIG. 7A). Within the biological sample, a non-target biological population is bound to magnetic particles. The method suitably includes circulating the biological sample through one or more fluidics pathways prior to or including the separation tube 701. The non-target biological population bound to the magnetic particles is suitably exposed to a magnetic field gradient to capture the non-target biological population bound to the magnetic particles. For example, as illustrated in FIG. 8, the biological sample passes through the separation tube 701, and the non-target sample with the bound magnetic particles is captured against the side of tube by the magnetic field (see also FIG. 24D-24E).

Un-bound components in the biological sample (i.e., the target biological population, including cells, proteins, DNA, or other structures that are desired, including T-Cells) are then circulated through one or more fluidics pathways, and are suitably collected by filtration or other mechanism, for example, in a separate area of the automated cell engineering system A magnetic field shield/barrier is then suitably inserted between the non-target biological population bound to the magnetic particles and the magnetic field to release the non-target biological population bound to the magnetic particles from the magnet. The non-target biological population bound to the magnetic particles is then circulated through one or more fluidics pathways of the automated cell culture system.

Suitably, the steps of circulating the biological sample, exposing the sample (and the non-target biological population bound to the magnetic particles), inserting the magnetic shield/barrier between the non-target population and the magnetic field, and the collection of the target biological population is repeated one or more times (suitably 2 or more, 3 or more, 4 or more, 5 or more, etc., times). Each time through this recycling increases the yield and/or purity of the target biological preparation, allowing for removal of more and more of the non-target biological population and separation and collection of more of the desired, target biological preparation.

Additional steps that can be included in the negative selection methods described herein include washing of the biological sample (e.g., a cell population), washing of the magnetic particles, transferring of target biological population to a cell culture zone (e.g., a proliferation chamber), and transfer of the non-target biological population to a waste chamber, and ultimate removal from the automated cell culture system.

As described herein, suitably the non-target biological population comprises one or more of cells, viruses, bacteria, proteins, DNA and/or RNA, and in embodiments the target biological population comprises one or more of cells, viruses, bacteria, proteins, DNA and/or RNA, and suitably includes T cells. Methods and compounds for binding the magnetic particles to a non-target biological population are described herein and suitably include the use of an antibody, a protein or a nucleic acid.

Exemplary magnetic fields are described herein, and suitably are generated by permanent magnets or electromagnets. Materials for use in preparing permanent magnets are described herein and include, for example, magnetite, neodymium, samarium-cobalt and/or Alnico. In embodiments, the permanent magnet is configured in a linear array. In embodiments in which an electromagnet is utilized, the insertion of the magnetic field shield/barrier can be replaced by turning off the electromagnet, for example by simply removing an electric current from the electromagnet to stop the magnetic field.

As described throughout, in embodiments, the magnetic field shield/barrier suitably comprises high magnetic permeability and saturation materials. As described herein, in embodiments, the magnetic field shield/barrier rotates to insert the magnetic field shield/barrier between the non-target biological population bound to the magnetic particles and the magnetic field. Such an embodiment is illustrated in FIGS. 8, 9 and 10A-10B, and described herein in detail.

In further embodiments, provided herein is a method for washing and recovering magnetic particles in an automated cell culture system.

Suitably, the method includes a. circulating the magnetic particles through one or more fluidics pathways of the automated cell culture system; b. exposing the magnetic particles to a magnetic field gradient to capture the magnetic particles; c. collecting the magnetic particles by applying a gas fluid phase followed by a liquid fluid phase; d. circulating the magnetic particles through one or more fluidics pathways of the automated cell culture system; and e. repeating steps c-d one or more times (e.g., 2 or more, 3 or more, 4 or more, 5 or more, 6 or more, 7 or more, 8 or more, 9 or more, 10 or more times, etc.).

As described herein, in embodiments, the magnetic particle is bound to a target biological population, which suitably occurs via an antibody, a protein or a nucleic acid.

In additional embodiments, the magnetic particle is bound to a non-target biological population, including via an antibody, a protein or a nucleic acid.

Exemplary non-target and target biological populations are described herein, and suitably the target population is any one or more of cells, viruses, bacteria, proteins, DNA and RNA, including T cells.

In embodiments, the magnetic field gradient is provided by one or more permanent magnets, including permanent magnets comprising magnetite, neodymium, samarium-cobalt or Alnico. Permanent magnets can be configured in a linear array, as described herein. In additional embodiments, the magnetic field gradient is provided by an electromagnet.

Suitably, as described herein, a magnetic field shield/barrier is inserted between the magnetic particles and the magnetic field to allow collection of the magnetic particles by blocking the magnetic field, and allowing for the release of the magnetic particles that have bound to the magnetic source. Exemplary materials for use in the magnetic field shield/barrier include high magnetic permeability and saturation materials. In embodiments in which an electromagnet is utilized, an electric current can removed from the one or more electromagnets to allow collection of the magnetic particles, simply shutting off the source of the electromagnet.

Exemplary gas phase fluids that can be utilized in the methods include one or more of air, nitrogen, oxygen, and carbon dioxide. Exemplary liquid phase fluids that can be used include one or more of water, buffered saline solution, culture medium, animal serum, chelating agents, and enzymes.

Bead Recovery Methods

Data from Negative and Positive Selection Methods, and Magnetic Particle Recovery, Including Multiple Magnetic Separations FIG. 22A-22D show the binding of magnetic particles to both target cells (purified cells) and waste cells (non-target population). As illustrated, the "improved process" which utilizes optimization of reagent quantities, demonstrates a high binding between magnetic particles and the waste cells (non-target population for negative selection), with lower "false negatives."

Figures 23A, 23B:
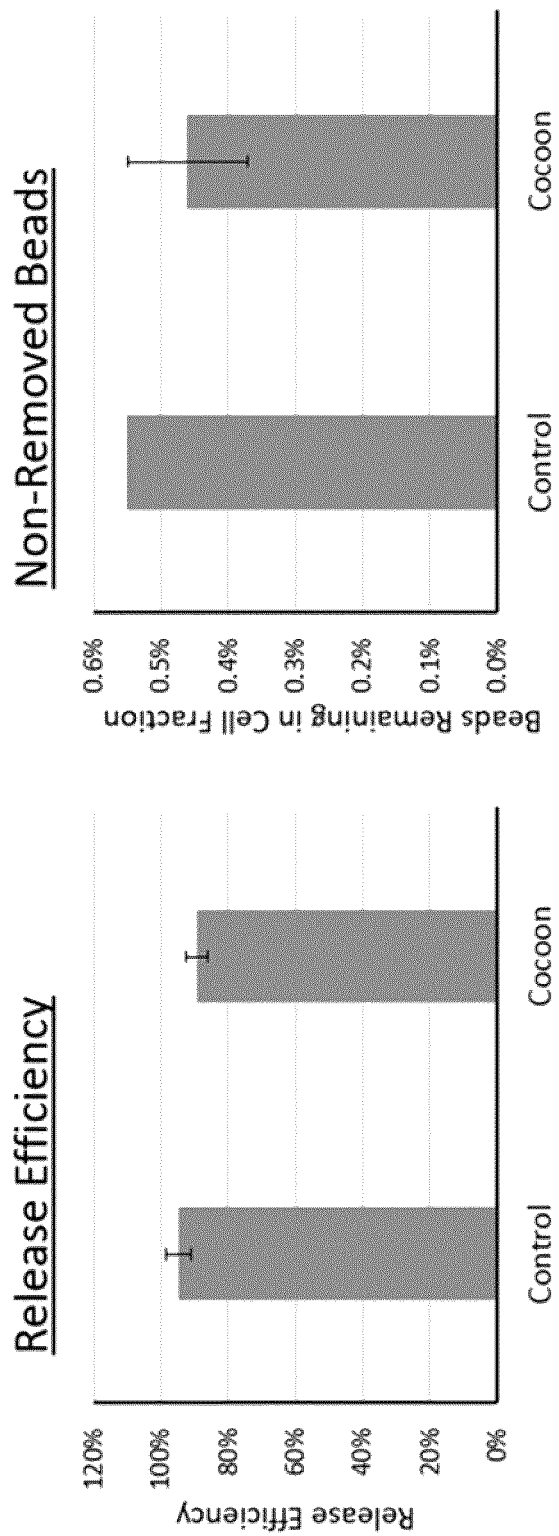
FIG. 23A-23B show the efficiency of bead release from cells in accordance with embodiments hereof.

FIG. 23A-23B represent the release from cells of magnetic particles. As illustrated, in FIG. 23A the attachment mechanisms utilized in the automated cell culture system (COCOON) shows similar bead-cell release as that of controls, illustrating the ability to recover cells (or other target biological populations) following a positive selection method. FIG. 23B shows the percentage of beads remaining among the target cells after release and bead removal using the automated cell culture system.

Figures 24A, 24B:
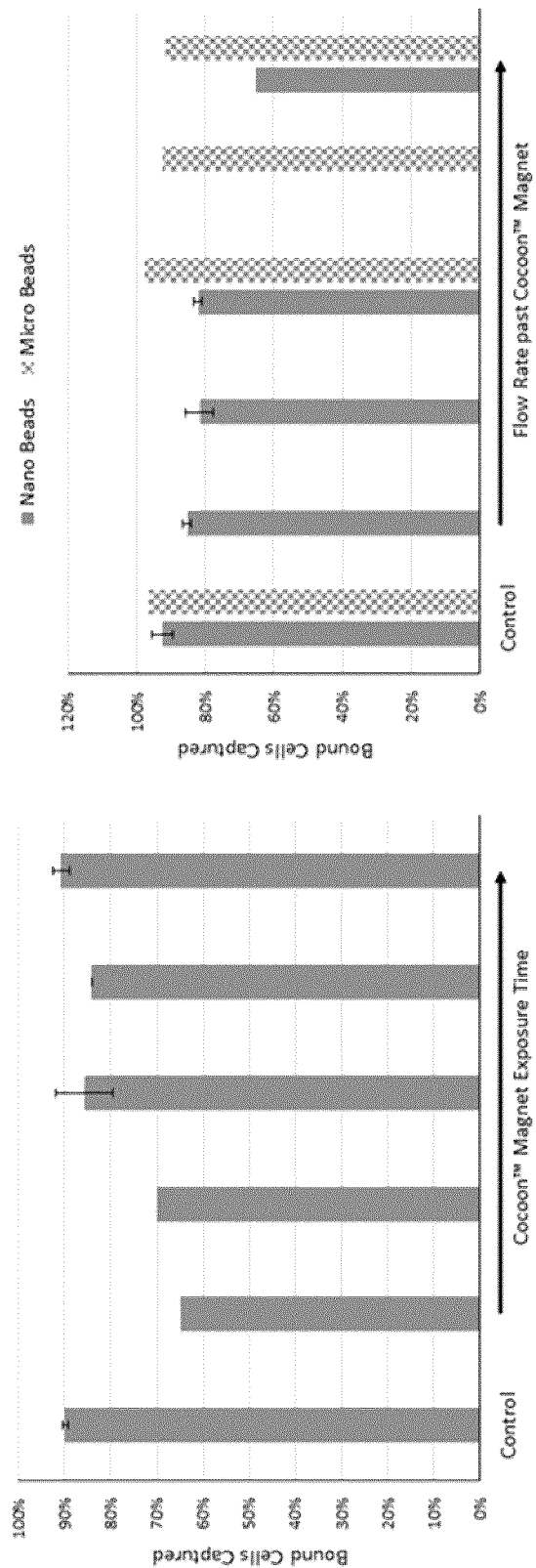
FIG. 24A-24C show the impact of strength of contact with a magnetic field and multiple cycles.

To determine the benefits of multiple magnetic separations (i.e., recirculating the sample through the automated cell culture system to be exposed to the magnetic field 2, 3, 4, 5, etc., times), experiments were performed looking at increasing exposure time to the magnet and reducing the flow rate. A shown in FIG. 24A, increasing the magnet exposure time (from left to right), increasing the percent of bound cells captured from about 65% to at least 90%, equivalent to control. Similarly, reducing the flow rate (right to left) in FIG. 24B illustrates an increase in bound cells capture from about 60% to about 85%, again, similar to control.

Table 1 below shows the increase in both bound cells acquired, and total cell yield, using multiple passes using the magnetic separation methods described herein.

TABLE 1

Impact of Yield - Multiple Passes through Magnetic Field

| Process Parameter | Result |
| --- | --- |
| % Bound Cells Acquired - $1^{st}$ Pass | 84.7% |
| % Bound Cells Acquired - $2^{nd}$ and $3^{rd}$ Pass | 11.6% (96.3% Total) |
| % Total Cell Yield - $1^{st}$ Pass | 74.6% |
| % Total Cell Yield - $2^{nd}$ and $3^{rd}$ Pass | 94.1% |

Figure 24C:
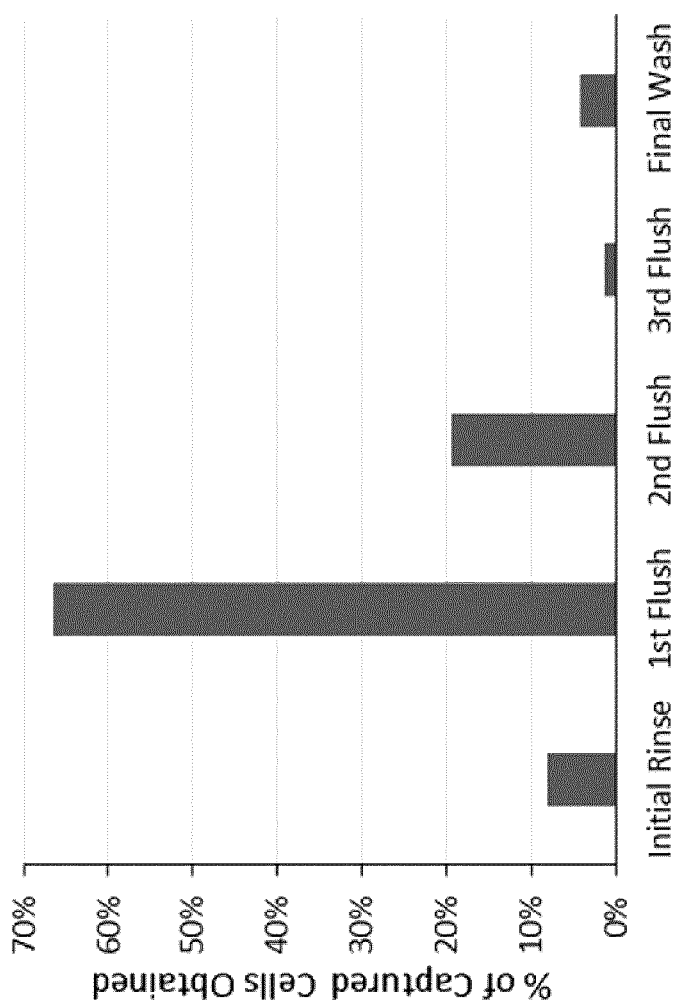

FIG. 24C shows the impact of number of cycles of fluid flushes to release the captured biological samples from the separation line, illustrating significant recovery after the first two flushes.

Figures 24D, 24E:
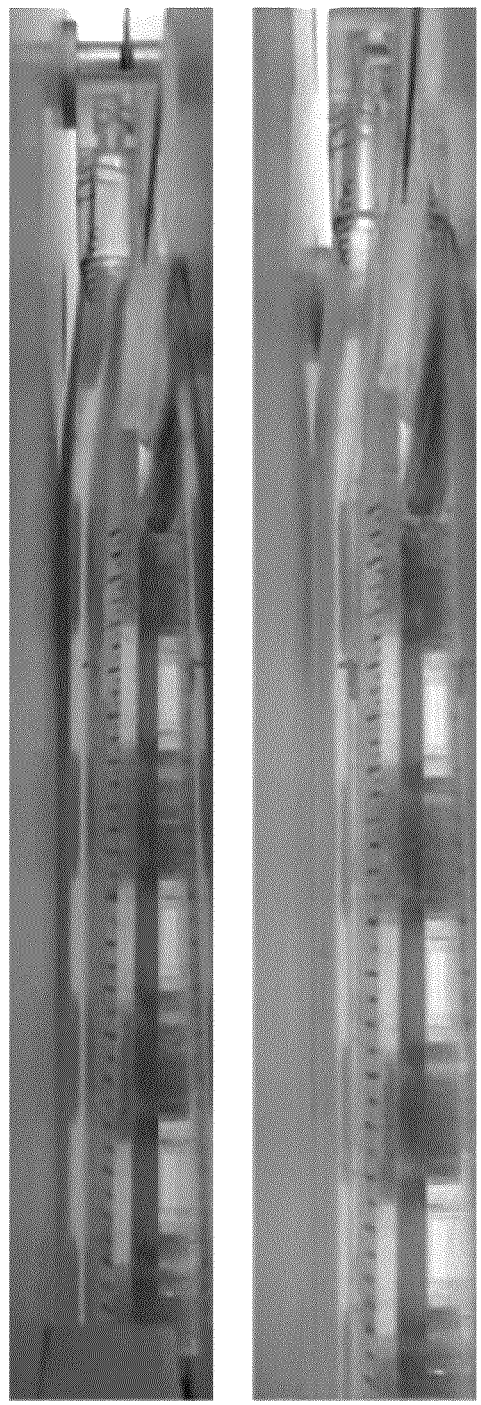
FIG. 24D-24E show capture and removal of cells in a separation tube, as described herein.

FIG. 24D-24E show the capture of cells bound to magnetic particles (top) in the separation tube using the magnetic field, and release of cells (bottom) following turning off the magnetic field and applying cycles of fluid flushes (as per FIG. 24C), illustrating the effectiveness of the methods described herein.

Figures 25A, 25B, 25C, 25D, 25E, 25F:
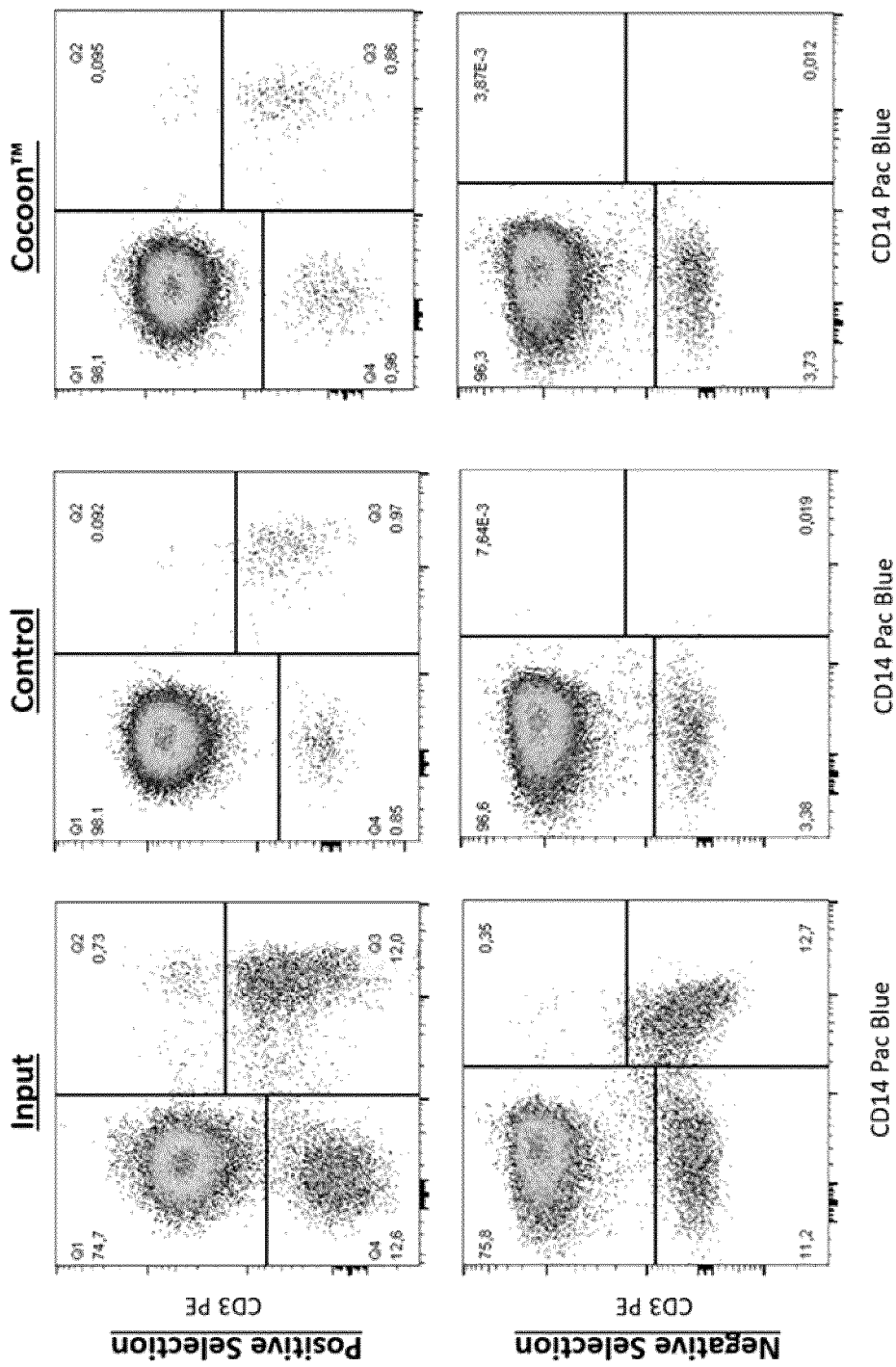
FIG. 25A-25L show the results of positive and negative selection of target cells as described herein.
Figures 25G, 25H, 25I:
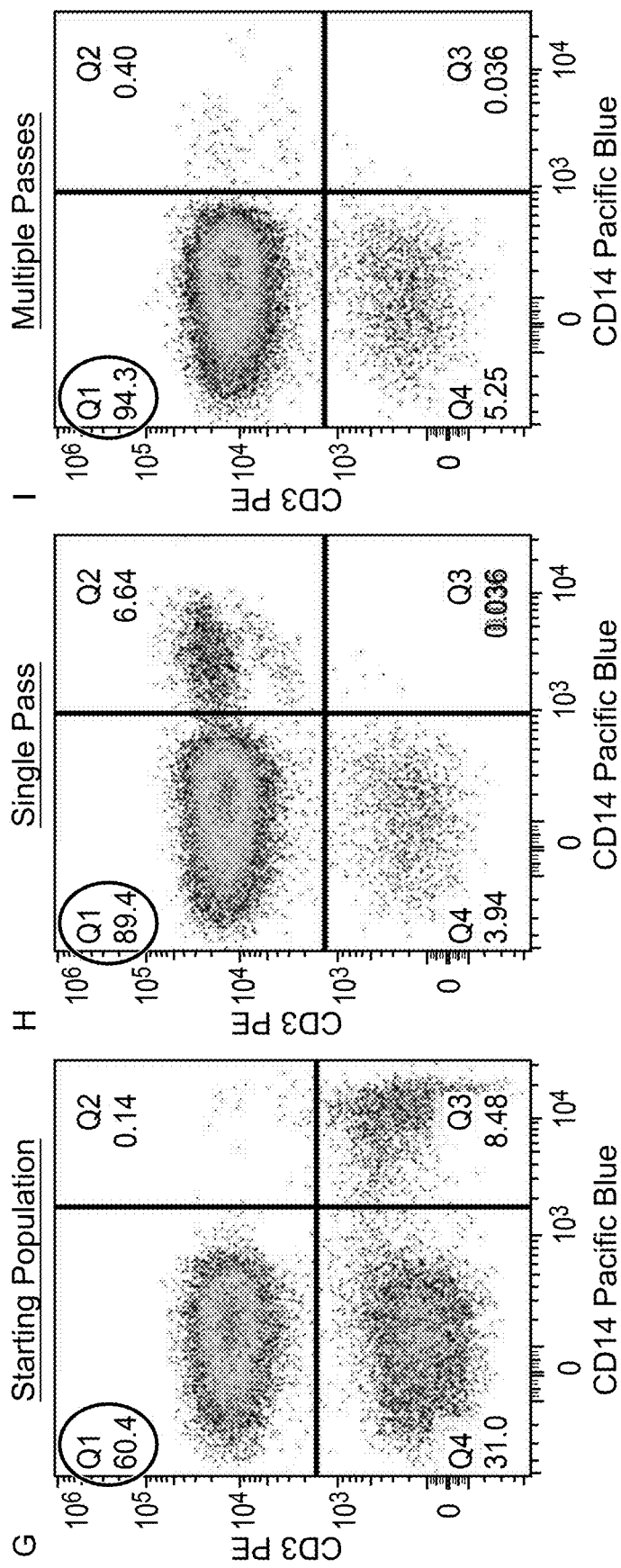
Figures 25J, 25K, 25L:
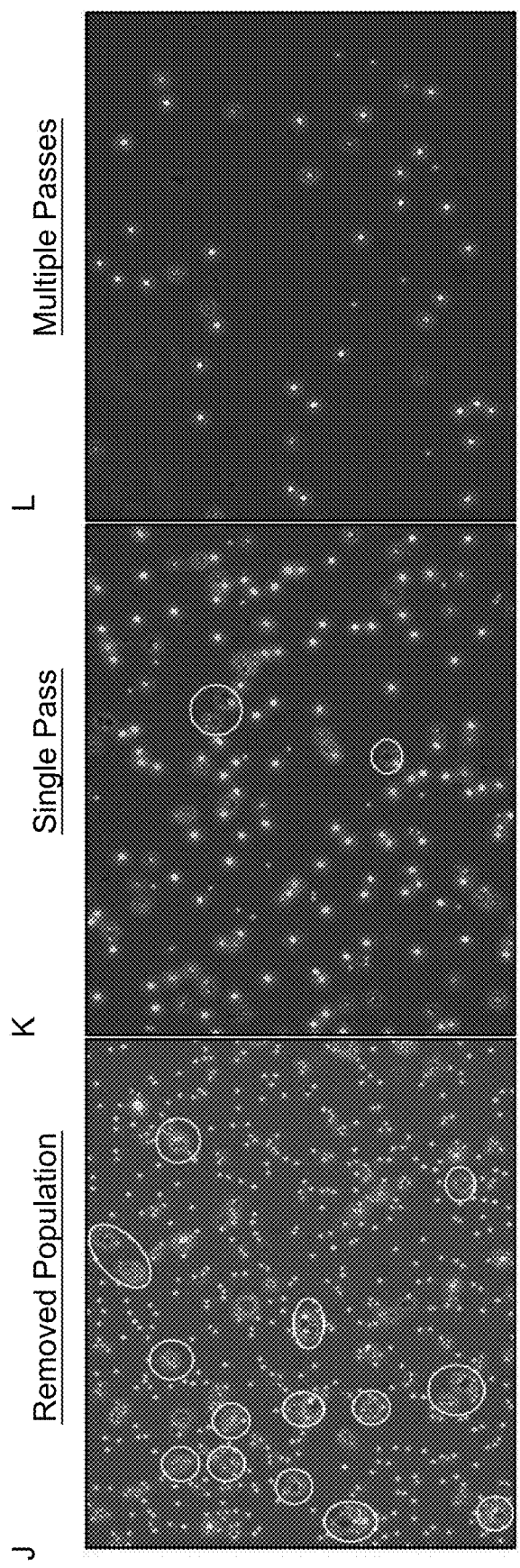

In FIG. 25A-25F, the positive and negative selection methods illustrate a high level of purification of the target biological population (cells), with similar recovery between control and the automated cell culture system (COCOON) described herein for both positive and negative selection applications. FIG. 25G-25I show purification of cells using negative selection showing improvement in purity by per-forming multiple passes using the recirculation line. CD3+ CD14+ populations are undesired bead bound monocyte-T cell aggregates. FIG. 25J-25L show population purification using a negative selection process. Multiple passes successfully remove the unwanted bead bound cells (highlighted by white circles).

Figures 26A, 26B, 26C:
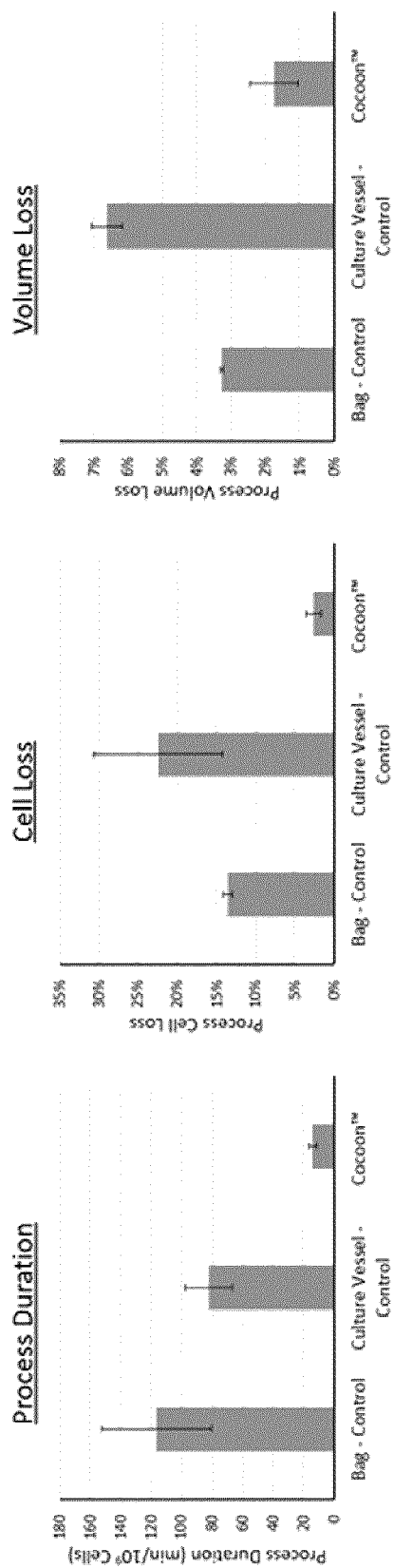
FIG. 26A-26D show the recovery of cells in an automated cell culture system as described herein.
Figure 26D:
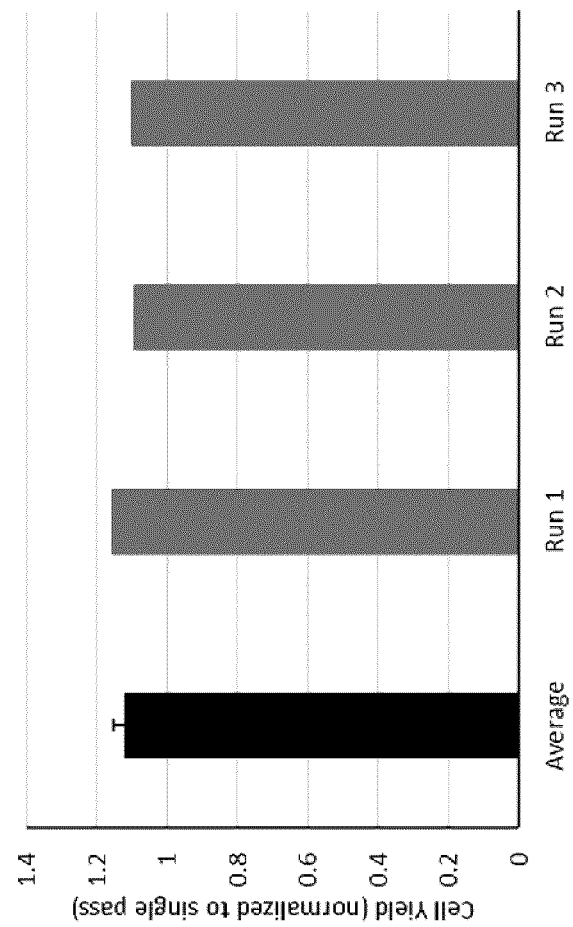

FIG. 26A-26C show the advantages of the magnetic separation in the automated cell culture systems described herein, with FIG. 26A illustrating the significant reduction in the process duration, FIG. 26B illustrating the low cell loss, and FIG. 26C showing the reduction in volume loss, as compared to bag and culture-vessel-based controls. FIG. 26D shows population purification using a positive selection process. Multiple passes through the recirculation line improves the cell yield compared to a single pass.

Figures 27A, 27B:
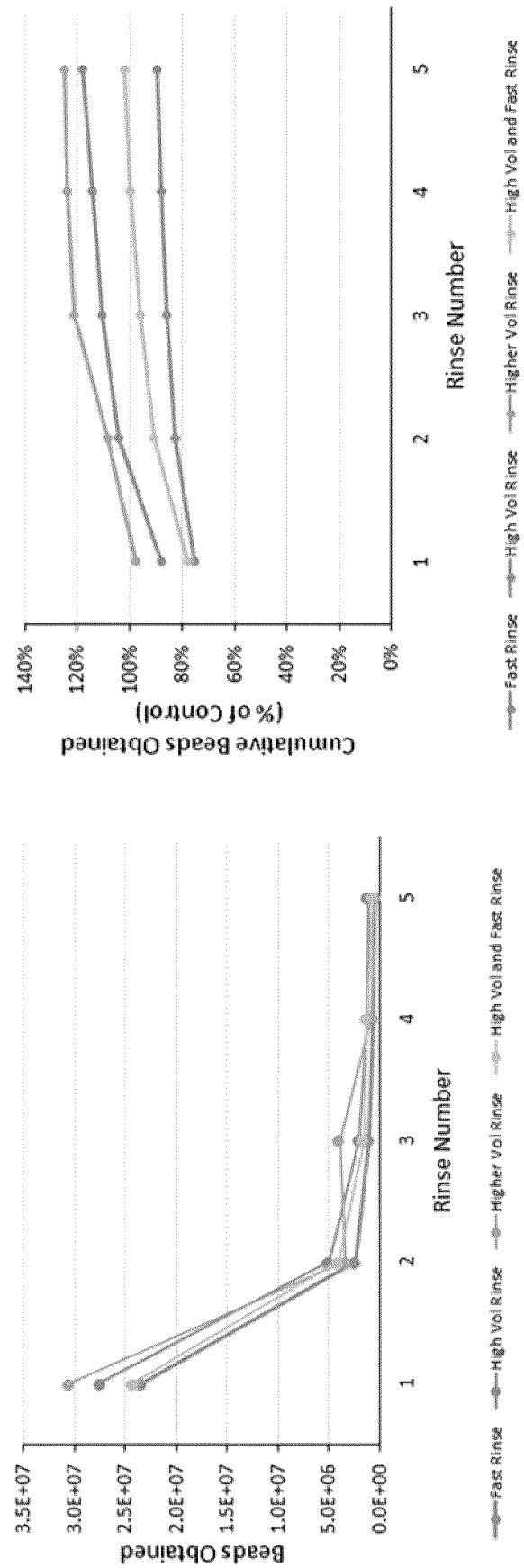
FIG. 27A-27B show the recovery of magnetic particles after washing in an automated cell culture system as described herein.

FIG. 27A-27B show the ability to recover magnetic particles after washing in the automated cell culture systems described herein, with FIG. 27A illustrating the impact of subsequent rinses of the separation tube 701 on absolute recovery, and FIG. 27B illustrating the impact on cumulative particle recovery of subsequent rinses of the separation tube 701 relative to a typical manual process.

The descriptions of the various embodiments and/or examples of the present invention have been presented for purposes of illustration but are not intended to be exhaustive or limited to the embodiments and/or examples disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for magnetically separating and collecting a target biological population from a biological sample, comprising:
   a. a magnetic field source including multiple magnets;
   b. a cell proliferation chamber;
   c. one or more fluidics pathways;
   d. a separation tube for flowing the biological sample, the separation tube running along a length of the multiple magnets, the separation tube being aligned with the magnetic field source;
   e. a magnetic field shield/barrier configured to be rotated between the magnetic field source and the separation tube to release the target biological population bound to magnetic particles;
   f. an electro-mechanical drive assembly comprising a servo and a gear train for rotating the magnetic field shield/barrier between the magnetic field source and the separation tube, wherein the magnetic field source and the magnetic field shield/barrier are connected to the servo and the gear train, allowing for the servo and the gear train to rotate the magnetic field source and the magnetic field shield/barrier; and
   g. input locations for reagents;
      wherein the magnetic field shield/barrier is rotated using the servo and the gear train such that the magnetic field shield/barrier is between the magnetic field source and the separation tube to release the target biological population when bound to the magnetic particles as the biological sample passes through the separation tube.

2. The system of claim 1, further including a cassette comprising the separation tube for flowing the biological sample.

3. The system of claim 1, wherein the magnetic field shield/barrier is a material with high magnetic permeability and saturation.

4. The system of claim 3, the material with high magnetic permeability and saturation is selected from the group consisting of iron, iron alloy, ferritic steel, and Hiperco-50.

5. The system of claim 1, wherein the magnetic field source comprises one or more permanent magnets.

6. The system of claim 5, wherein the one or more permanent magnets comprises neodymium, samarium-cobalt, or Alnico.

7. The system of claim 1, wherein the magnetic field source comprises the multiple magnets configured in a linear array.

8. The system of claim 7, wherein the multiple magnets in the linear array are arranged with opposite pole directions perpendicular to an axis of the linear array.

9. The system of claim 1, wherein the electro-mechanical drive assembly is controlled by software.

\* \* \* \* \*